(12) United States Patent
Klemets

(10) Patent No.: US 7,720,096 B2
(45) Date of Patent: May 18, 2010

(54) RTP PAYLOAD FORMAT FOR VC-1

(75) Inventor: Anders E. Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 710 days.

(21) Appl. No.: 11/275,426

(22) Filed: Dec. 30, 2005

(65) Prior Publication Data

US 2007/0086481 A1  Apr. 19, 2007

Related U.S. Application Data

(60) Provisional application No. 60/726,407, filed on Oct. 13, 2005.

(51) Int. Cl.
*H04J 3/16* (2006.01)
(52) U.S. Cl. .................. 370/466; 370/389; 725/143
(58) Field of Classification Search .......... 370/216, 370/229, 230, 230.1, 231, 232, 233, 234, 370/235, 261, 263, 264, 265, 352, 389, 400, 370/466, 260, 390, 329; 348/14.1, 14.08, 348/14.12, 14, 15, 16, 17, 14.9, 462; 375/240.02, 375/240.05, 240.07; 725/31, 135, 105, 136, 725/138, 139, 143, 151, 38, 78, 27; 380/46, 380/277, 200, 255; 709/204, 205, 231
See application file for complete search history.

(56) References Cited

U.S. PATENT DOCUMENTS

| 5,224,166 | A  | 6/1993  | Hartman, Jr. |
| 6,134,243 | A  | 10/2000 | Jones et al. |
| 6,205,140 | B1 | 3/2001  | Putzolu et al. |
| 6,278,478 | B1 | 8/2001  | Ferriere |
| 6,512,778 | B1 | 1/2003  | Jones et al. |
| 6,654,389 | B1 | 11/2003 | Brunheroto et al. |
| 6,856,997 | B2 | 2/2005  | Lee et al. |
| 6,918,034 | B1 | 7/2005  | Sengodan et al. |
| 6,944,296 | B1 | 9/2005  | Liu et al. |

(Continued)

FOREIGN PATENT DOCUMENTS

CN        1643474        7/2005

(Continued)

OTHER PUBLICATIONS

M. Civanlar, RTP Payload format for MPEG1/MPEG2 Video, Jan. 1998, Network Working Group, Request for Comments : 2250, pp. 1-16.*

(Continued)

*Primary Examiner*—Frank Duong
*Assistant Examiner*—Abdullah Riyami
(74) *Attorney, Agent, or Firm*—Lee & Hayes, PLLC

(57) ABSTRACT

An RTP payload format for VC-1 is described. The RTP payload format accommodates an RTP payload that can include one or more Access Units (AUs). An Access Unit can provide a complete frame of VC-1 information. Alternatively, a frame of VC-1 information can be fragmented among multiple Access Units. Each Access Unit includes an Access Unit header and an Access Unit payload. The RTP payload format incorporates various provisions for improving the efficiency and robustness in the processing of the VC-1 information, enabled, in part, by control information conveyed by the respective Access Unit headers of the Access Units.

17 Claims, 9 Drawing Sheets

U.S. PATENT DOCUMENTS

| | | | |
|---|---|---|---|
| 6,965,646 B1* | 11/2005 | Firestone | 375/240.26 |
| 6,983,049 B2 | 1/2006 | Wee et al. | |
| 6,993,137 B2 | 1/2006 | Fransdonk | |
| 7,010,032 B1 | 3/2006 | Kikuchi et al. | |
| 7,080,043 B2 | 7/2006 | Chase, Jr. et al. | |
| 7,120,250 B2 | 10/2006 | Candelore | |
| 7,136,945 B2 | 11/2006 | Gibbs et al. | |
| 7,145,919 B2 | 12/2006 | Krishnarajah et al. | |
| 7,174,452 B2 | 2/2007 | Carr | |
| 7,243,366 B2 | 7/2007 | Medvinsky et al. | |
| 7,257,641 B1* | 8/2007 | VanBuskirk et al. | 709/238 |
| 7,346,160 B2 | 3/2008 | Michaelsen | |
| 7,536,418 B2 | 5/2009 | Buchsbaum et al. | |
| 2001/0052135 A1 | 12/2001 | Balakrishnan et al. | |
| 2002/0002674 A1 | 1/2002 | Grimes et al. | |
| 2002/0004773 A1 | 1/2002 | Xu et al. | |
| 2003/0041257 A1 | 2/2003 | Wee et al. | |
| 2003/0056118 A1 | 3/2003 | Troyansky et al. | |
| 2003/0081592 A1 | 5/2003 | Krishnarajah et al. | |
| 2003/0103243 A1* | 6/2003 | Watanabe et al. | 358/405 |
| 2003/0131353 A1 | 7/2003 | Blom et al. | |
| 2003/0161473 A1 | 8/2003 | Fransdonk | |
| 2004/0042451 A1 | 3/2004 | Takaku | |
| 2004/0125757 A1 | 7/2004 | Mela et al. | |
| 2004/0125791 A1* | 7/2004 | Hoffmann | 370/352 |
| 2004/0143736 A1 | 7/2004 | Cross et al. | |
| 2004/0249759 A1 | 12/2004 | Higashi et al. | |
| 2005/0002402 A1* | 1/2005 | Fairman | 370/395.5 |
| 2005/0002525 A1 | 1/2005 | Alkove et al. | |
| 2005/0008240 A1* | 1/2005 | Banerji et al. | 382/238 |
| 2005/0069039 A1* | 3/2005 | Crinon | 375/240.26 |
| 2005/0099869 A1* | 5/2005 | Crinon et al. | 365/222 |
| 2005/0108746 A1* | 5/2005 | Futagami et al. | 725/31 |
| 2005/0157727 A1* | 7/2005 | Date et al. | 370/395.21 |
| 2005/0163052 A1 | 7/2005 | Savage et al. | |
| 2005/0169303 A1* | 8/2005 | Toma et al. | 370/466 |
| 2005/0169444 A1* | 8/2005 | Inon | 379/88.18 |
| 2005/0177875 A1 | 8/2005 | Kamperman et al. | |
| 2005/0216413 A1 | 9/2005 | Murakami et al. | |
| 2005/0254526 A1 | 11/2005 | Wang et al. | |
| 2005/0265555 A1 | 12/2005 | Pippuri | |
| 2006/0104356 A1* | 5/2006 | Crinon | 375/240.12 |
| 2006/0130104 A1* | 6/2006 | Budagavi | 725/105 |
| 2006/0161635 A1 | 7/2006 | Lamkin et al. | |
| 2006/0167985 A1 | 7/2006 | Albanese et al. | |
| 2006/0184790 A1* | 8/2006 | Oliveira et al. | 713/160 |
| 2006/0262732 A1* | 11/2006 | Joutsenvirta et al. | 370/254 |
| 2006/0268099 A1* | 11/2006 | Potrebic et al. | 348/14.01 |
| 2006/0291475 A1* | 12/2006 | Cohen | 370/395.42 |
| 2007/0003064 A1 | 1/2007 | Wiseman et al. | |
| 2007/0016594 A1* | 1/2007 | Visharam et al. | 707/100 |
| 2007/0016784 A1 | 1/2007 | Vauclair | |
| 2007/0104105 A1* | 5/2007 | MeLampy et al. | 370/235 |
| 2007/0106814 A1* | 5/2007 | Son et al. | 709/232 |
| 2007/0171903 A1 | 7/2007 | Zeng et al. | |
| 2007/0248073 A1* | 10/2007 | Pattavina et al. | 370/345 |
| 2007/0274393 A1* | 11/2007 | Toma et al. | 375/240.23 |
| 2008/0052751 A1* | 2/2008 | Cromarty et al. | 725/113 |
| 2008/0075168 A1* | 3/2008 | Toma et al. | 375/240.15 |
| 2008/0126812 A1* | 5/2008 | Ahmed et al. | 713/189 |
| 2008/0187284 A1* | 8/2008 | Ikeda et al. | 386/69 |
| 2008/0216116 A1* | 9/2008 | Pekonen et al. | 725/39 |

FOREIGN PATENT DOCUMENTS

| | | |
|---|---|---|
| EP | 1271830 A2 | 1/2003 |
| EP | 1041823 | 10/2004 |
| EP | 1494425 | 1/2005 |
| JP | 2000287192 A | 10/2000 |
| JP | 2002044135 A | 2/2002 |
| RU | 2144736 | 1/2000 |
| RU | 2159507 | 11/2000 |
| WO | WO0011849 | 2/2000 |
| WO | WO0251096 A1 | 6/2002 |
| WO | WO03028293 A1 | 4/2003 |
| WO | WO2004023717 | 3/2004 |
| WO | WO2004030384 | 4/2004 |
| WO | WO2004097605 A1 | 11/2004 |

OTHER PUBLICATIONS

Official Notice Of Rejection For Malaysian Patent Application No. PI20042167 Mailed On Dec. 26, 2007, pp. 5.

Search Report and Written Opinion in PCT/US2006/039129, date of mailing Feb. 15, 2007, 11 pages.

Curet, et al., "RTP Payload Format for MPEG-4 FlexMultiplexed Streams," Internet Engineering Task Force, Internet Draft, XP-001075015, Nov. 8, 2001, 12 pages.

Handley, at al., "SDP: Session Description Protocol," Network Working Group, Request for Comments: 2327, available at <<http://www.ietf.org/rfc/rfc2327.txt>>, Apr. 1998, pp. 1-40.

Klemets, "RTP Payload Format for Video Codec 1 (VC-1)," Network Working Group, Request for Comments: 4425, available at <<http://rfc4425.x42.com/>>, Feb. 2006, pp. 1-34.

Nafaa, et al, "RTP4mux: A Novel MPEG-4 RTP Payload for Multicast Video Communications Over Wireless IP," available at <<http//www.polytech.uiv-nantes.PDF>>, accessed on Mar. 22, 2005, 10 pages.

"Proposed SMPTE Standard for Television: VC-1 Compressed Video Bitstream Format and Decoding Process," Specification for VC-1, The Society of Motion Picture and Television Engineers, Aug. 23, 2005, pp. 1-480.

"RTP Payload Format for MPEG-4 Streams," Internet Engineering Task Force, Internet Draft, XP-001033580, Jul. 2001, 41 pages.

Schulzrinne, "RTP Profile for Audio and Video Conferences with Minimal Control," Network Working Group, Request for Comments: 1890, 1996, available at <<http://faqs.org/rfcs/rfc1890.html>>, accessed on Jan. 7, 2004, 20 pages.

Schulzrinne, et al., "RTP: A Transport Protocol for Real-Time Applications," Network Working Group, Request for Comments: 3550, Jul. 2003, pp. 1-98.

Won-Ho Kim, "Design and Implementation of MPEG-2/DVB Scrambler Unit," 1997 International Conference on Consumer Electronics, vol. 43, No. 3., Jun. 1997, pp. 320-321.

"SMPTE Standard for Television, Audio and Film—Time and Control Code," The Society of Motion Picture and Television Engineers, ANSI/SMPTE 12M-1995, Sep. 12, 1995, 19 pages.

Search Report and xWritten Opinion in PCT/US2006/039129, date of mailing Feb. 15, 2001, 11 pages.

Mehaoua et al, "RTP4mux: A Novel MPEG-4 RTP Payload for Multicast Video Communications over Wireless IP", Retrieved from the Internet Mar. 22, 2005: URL: http//www.polytech.uiv-nantes.PDF.

Russian Decision on Grant for Russian Patent Application No. 2004120267 mailed on Apr. 15, 2009, 17 pgs.

Chinese First Office Action for Chinese Patent Application No. 200680029303.X mailed on Apr. 24, 2009, 10 pgs.

Kim et al, "Design and Implementation of MPEG-2/DVB Scrambler Unit," International Conference on Consumer Electronics, vol. 43 No. 3., 1997, pp. 320-321.

Fukazawa et al, "Broadband Streaming System (V2)," NTT R&D, vol. 52, No. 1, Jan. 10, 2003, pp. 29-38.

* cited by examiner

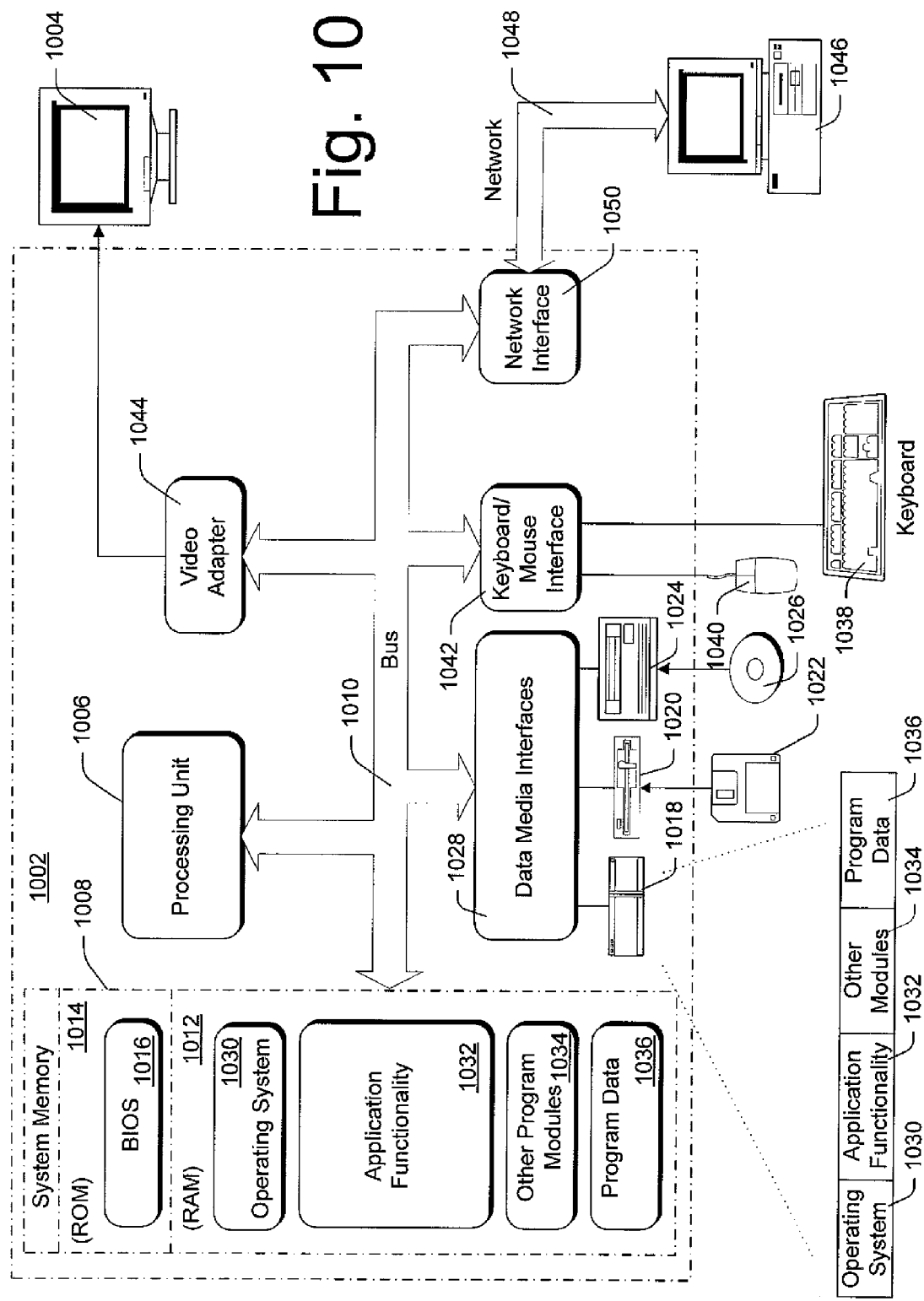

RTP PAYLOAD FORMAT FOR VC-1

This application claims the benefit of U.S. Provisional Application No. 60/726,407, filed on Oct. 13, 2005. The referenced provisional application is incorporated by reference herein in its entirety.

The present application is also related to co-pending U.S. patent application Ser. No. 10/612,851, entitled "RTP Payload Format," filed on Jul. 3, 2003, naming the inventors of Anders E. Klemets and James M. Alkove. This related application is incorporated by reference herein in its entirety.

BACKGROUND

Real-Time Transport Protocol (RTP) is a well known protocol for delivering media information (audio and video) over an IP network. The RTP protocol is described in fall in Schulzrinne et al., "RTP: A Transport Protocol for Real-Time Applications," STD 64, RFC 3550, July 2003. As broadly indicated in FIG. 1, an RTP packet 100 includes an RTP packet header 102 and an RTP payload 104. The RTP header 102 includes various well-known fields of metadata enumerated in FIG. 1. A device which receives the RTP packet uses the information in the RTP header 102 to govern the processing of the information within the payload 104.

RTP requires a separate so-called payload format for each codec. Well known codecs for processing media information include MPEG-2, H.264/MPEG-4 AVC, MP3, and so forth. The payload format specifies the precise manner in which RTP is used to encapsulate the codec data. In other words, a payload format is essentially a mapping specification, which describes in detail how the video or audio data is arranged inside the RTP packets. Each codec has unique complexities. Thus, the task of developing an RTP payload format for a codec raises a number of unique challenges.

The subject matter set forth herein describes an RTP payload format for the Video Codec 1 (VC-1) video codec. VC-1 has broad applicability, being suitable for low bit rate Internet streaming applications to HDTV broadcast and Digital Cinema applications with nearly lossless coding. More specifically, for instance, VC-1 is widely used for downloading and streaming of movies on the Internet, in the form of Windows Media Video 9 (WMV-9). VC-1 has also been adopted as a mandatory compression format for various high-definition DVD formats.

The VC-1 codec is described in "Proposed SMPTE Standard for Television: VC-1 Compressed Video Bitstream Format and Decoding Process," The Society of Motion Picture and Television Engineers, White Plains, N.Y., Aug. 23, 2005 (henceforth referred to as simply SMPTE 421M). The SMPTE 421M specification is incorporated by reference herein in its entirety.

SUMMARY

An RTP payload format for VC-1 is described. The RTP payload format accommodates an RTP payload that can include one or more Access Units (AUs). An Access Unit can provide a complete frame of VC-1 information. Alternatively, a frame of VC-1 information can be fragmented among multiple Access Units. Each Access Unit includes an Access Unit header and an Access Unit payload. The RTP payload format incorporates various provisions for improving the efficiency and robustness in the processing of the VC-1 information, enabled, in part, by control information conveyed by the respective Access Unit headers of the Access Units.

The subject matter set forth in this Summary section refers to exemplary manifestations of the invention, and hence does not limit the scope of the invention set in the Claims section.

BRIEF DESCRIPTION OF THE DRAWINGS

FIG. 10 shows an exemplary computer environment for implementing aspects of the system of FIG. 5.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

An RTP payload format for VC-1 is described herein.

This disclosure includes the following sections. Section A presents an introductory overview of the VC-1 standard. Section B presents an exemplary system for processing media information using the RTP payload format for VC-1. Section C describes an exemplary structure of the RTP payload format. Section D describes an exemplary manner of operation of the system of Section A. And section E describes an exemplary computer environment for implementing aspects of the system of section B.

A. An Overview of VC-1

A.1. Profiles and Levels

To facilitate explanation of the unique RTP payload format for VC-1, a preliminary discussion of certain salient features of the SMPTE 421M standard will be provided in this introductory section. In this introductory section, certain definitions and explanations are excerpted from the SMPTE 421M specification.

Figures 2, 3:
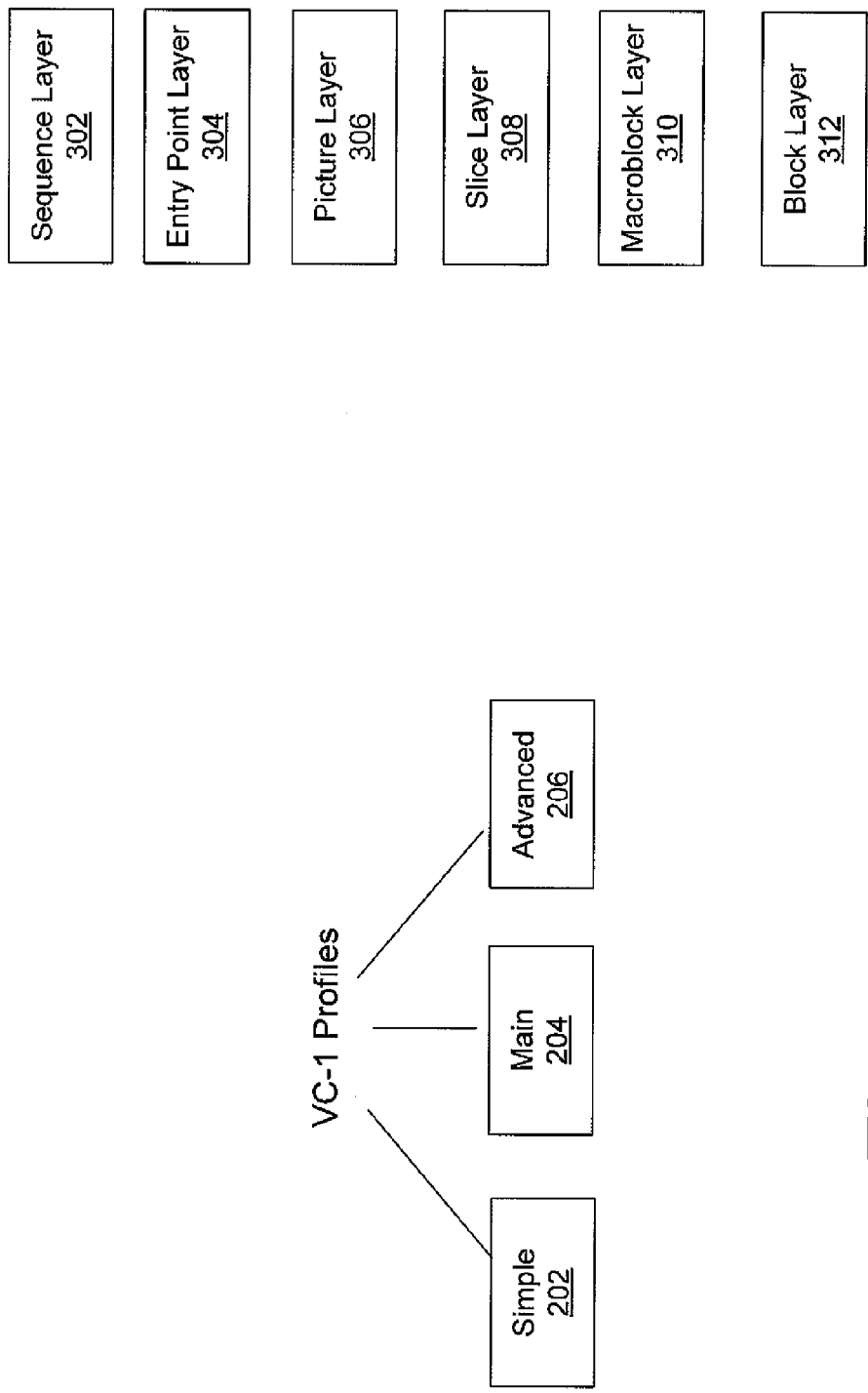
FIG. 2 shows the use of three different profiles in VC-1, as described in SMPTE 421M
FIG. 3 shows a layered model used by VC-1.

SMPTE 421M specifies the characteristics of VC-1 conformant bit streams and the processes required for decoding these streams. (However, this standard does not specify the VC-1 compression algorithm, thus allowing for different ways to implement a VC-1 encoder.) As indicated in FIG. 2, the VC-1 bit stream syntax has three profiles (202, 204, 206). A profile refers to a defined subset of the syntax of the standard, with a specific set of coding tools, algorithms, and syntax rules associated with it. Depending on the application in which VC-1 is used, some profiles may be more suitable than is others.

The Simple and Main profiles (202, 204) are designed for relatively low bit rate applications. For example, the maximum bit rate currently supported by the Simple profile is 384 Kbps. The Advanced profile 206 is designed for higher bit rate broadcast applications, such as digital TV, HD DVD or HDTV. The maximum bit rate currently supported by the Advanced profile is 135 Mbps, making it suitable for nearly lossless encoding of HDTV signals. The Advanced profile 206 also supports interlaced video frames. The Advanced profile 206 also accommodates in-band combination of user-data (e.g., meta-data) with a compressed bit stream. The user-data can be used, for example, for closed captioning support. Further, the Advanced profile 206 allows codec configuration parameters, such as picture aspect ratio, to be changed through in-band signaling in the compressed bit stream. Further still, certain features that can be used to achieve high compression efficiency, such as non-square pixels and support for interlaced pictures, are only included in the Advanced profile.

For each of the profiles, a certain number of "levels" have been defined. Unlike a "profile," which implies a certain set of features or syntax elements, a "level" is a set of constraints on the values of parameters in a profile, such as the bit rate or buffer size. The VC-1 Simple profile 202 has two levels, the Main profile 204 has three, and the Advanced profile 206 has five levels. Annex D of SMPTE 421M provides a more detailed list of the profiles and levels.

A.2. Layers

Referring now to FIG. 3, the VC-1 bit stream is defined as a hierarchy of layers. This is conceptually similar to the notion of a protocol stack of a networking protocol. The outermost layer is called the sequence layer 302. The other layers are entry point layer 304, picture layer 306, slice layer 308, macroblock layer 310, and block layer 312.

In the Simple and Main profiles (202, 204), a sequence in the sequence layer 302 consists of a series of one or more coded pictures (discussed below). In the Advanced profile 206, a sequence consists of one or more entry point segments (discussed below), where each entry point segment consists of a series of one or more pictures, and where the first picture in each entry point segment provides random access (discussed below). In the Advanced profile 206, a sequence header (described in greater detail below) can demarcate the start of a sequence.

The entry point layer 304 defines points in the bit stream that offer random access. More specifically, a random access point (also known as an entry point) in the bit stream is defined by the following guarantee: If decoding begins at this point, all frames needed for display after this point will have no decoding dependency on any data preceding this point, and are also present in the decoding sequence after this point. An entry point segment refers to a segment that is present between one entry point and a following entry point. In the Advanced profile 306, entry points can be demarcated by entry point headers (as described in greater detail below). The Simple and Main profiles (202, 204), on the other hand, do not employ segments demarcated by entry point headers; rather, in these profiles (202, 204), each I-picture comprises a random access point.

As to the picture layer 306, a picture refers to source, coded or reconstructed image data. Each picture can be coded as an I-picture, P-picture, skipped picture, B-picture, or as a B-picture. These terms are well known in the art and are defined, for instance, in section 4.12 of SMPTE 421M. A P-picture is a picture that is coded using motion compensated prediction from past reference fields or frames. A B-picture is a picture that is coded using motion compensated prediction from past and/or future reference fields or frames. A B-picture cannot be used for predicting any other picture. An I picture refers to an intra-coded picture, that is, a picture coded using information only from itself.

For progressive video, a picture is identical to a frame, while for interlaced video, a picture may refer to a frame, or the top field or the bottom field of the frame depending on the context. Progressive refers to the property of frames where all the samples of the frame represent the same instance in time. Interlace is the property of frames where alternating lines of the frame represent different instances in time. More formally, a frame contains lines of spatial information of a video signal. For progressive video, these lines contain samples starting from one time instant and continuing through successive lines to the bottom of the frame. For interlaced video, a frame consists of two fields, a top field and a bottom field. One of these fields will commence one field period later than the other.

As to the slice layer 308, macroblock layer 310, and the block layer 312, each picture is composed of a collection of slices, each slice is composed of a collection of macroblocks, and each macroblock is composed of a collection of blocks. Finally, a block can refer to an 8-row by 8-column matrix of samples, or 64 transform coefficients. The slice layer 302 is only present in the Advanced profile 206.

A3. BDUs and EBDUs

For the Advanced profile 206, SMPTE 421M organizes the information shown in FIG. 3 in units referred to as bit-stream data units (BDUs). A BDU is a unit of the compressed data which may be parsed (e.g., syntax decoded) independently of other information at a same hierarchical level. A BDU can be, for example, a sequence layer header, an entry point header, a frame, or a slice.

The beginning of a BDU is signaled by an identifier called Start Code (SC). For instance, sequence layer headers and entry point headers are BDUs and thus can be easily identified by their Start Codes. See Annex E of SMPTE 421M for a complete list of Start Codes. Note that blocks and macroblocks are not BDUs and thus do not have a Start Code and are not necessarily byte-aligned. To prevent accidental emulation of the Start Code in the coded bit stream, SMPTE 421M defines an encapsulation mechanism that uses byte stuffing. A BDU which has been encapsulated by this mechanism is referred to as an Encapsulated BDU, or EBDU.

A.4. Sequence Layer Headers and Entry Point Headers

Consider in greater detail the sequence layer header BDU of the Advanced profile 206. A sequence layer header contains parameters that are necessary to initialize the VC-1 decoder. These parameters apply to all entry point segments until a next occurrence of a sequence layer header in the coded bit stream. The parameters in the sequence layer header include the Advanced profile level, the dimensions of the coded pictures, the aspect ratio, interlace information, the frame rate, and up to 31 leaky bucket parameter sets for a Hypothetical Reference Decoder (HRD) (discussed in greater detail below). Section 6.1 of SMPTE 421M provides the formal specification of the sequence layer header.

Consider next in greater detail the entry point header BDU of the Advanced profile 206. As mentioned above, an entry point header demarcates a random access point within the bit stream. The entry point header also specifies current buffer fullness values for the leaky buckets in the HRD. The header also specifies coding control parameters that are placed in effect until the occurrence of a next entry point header in the bit stream. See Section 6.2 of SMPTE 421M for the formal specification of the entry point header.

To clarify and reiterate, the Simple and Main profiles (202, 204) do not make use of sequence layer headers or entry point headers. For these profiles (202, 204), decoder initialization parameters can be conveyed out-of-band from the coded bit stream.

A.5. Hypothetical Reference Decoder (HRD)

The above-referenced "HRD" refers to a so-called hypothetical reference decoder. As described fully in the SMPTE 421M specification, a hypothetical reference decoder (also know as a video buffering verifier) refers to a hypothetical decoder that is conceptually connected to the output of the encoder. Its purpose is to provide a constraint on the variability of the data rate that an encoder or editing process may produce. A general description of HRD technology can be found in Ribas-Corbera, J., Chou, P. A., and S. L. Regunathan, "A generalized hypothetical reference decoder for H.264/AVC," IEEE Transactions on Circuits and Systems for Video Technology, August 2003.

The buffering model that governs the operation of the HRD is known as a "leaky bucket." A leaky bucket is characterized by three parameters, (R, B, F), where: R is a peak transmission bit rate (in bits per second) at which bits enter a decoder buffer; B is the capacity (in bits) of the decoder buffer; and F is an initial decoder buffer fullness (in bits), which shall be smaller than or equal to B. A leaky bucket "parameter set" for the HRD specifies a peak transmission bit rate and a decoder buffer capacity. Annex C of SMPTE 421M provides additional information regarding the application of the HRD to VC-1 bit streams.

A.6. Timing and Frame Ordering Considerations

Figure 4:
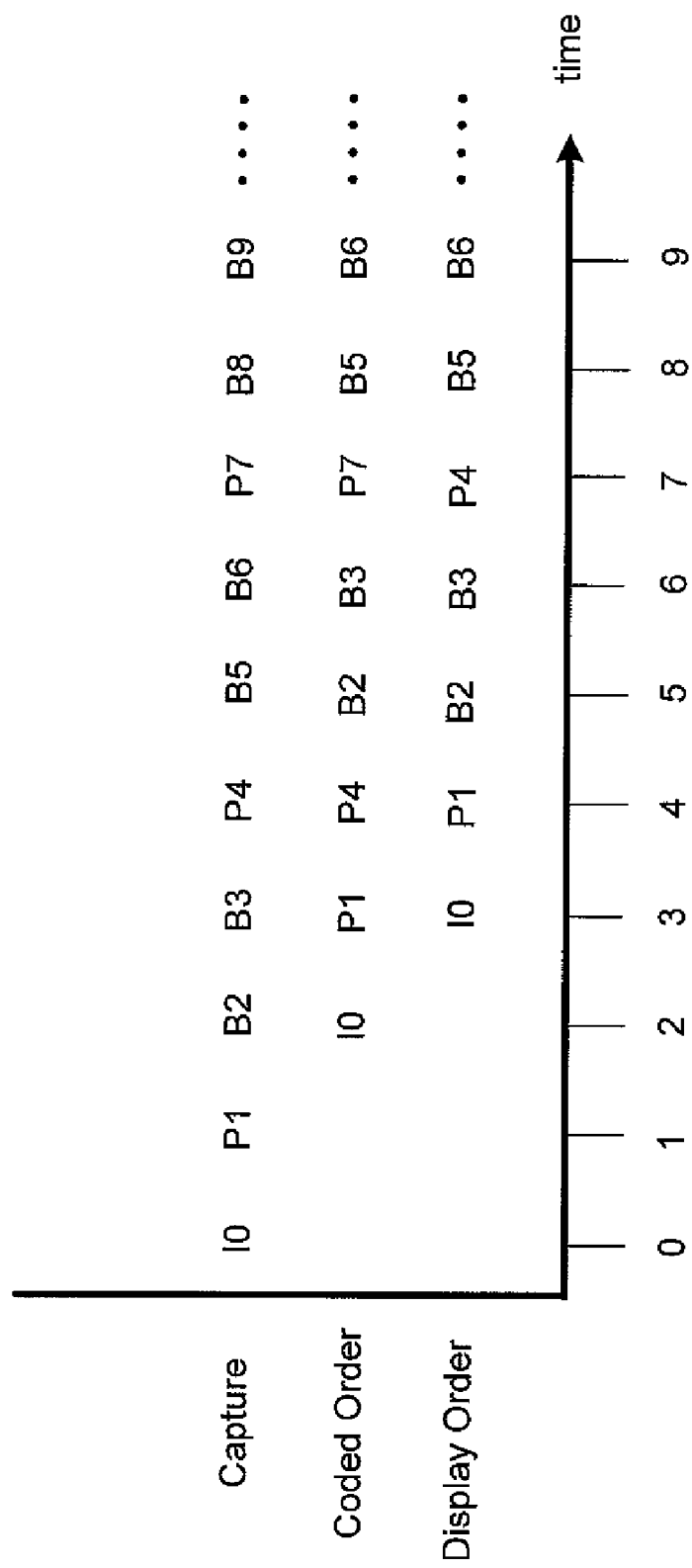
FIG. 4 shows a manner in which frames can be reordered in the processing of VC-1.

Advancing to FIG. 4, this figure shows the manner in which frames can be reordered in the course of processing. More specifically, frames are transmitted in a same order in which they are captured, except if B-pictures are present in the coded bit stream. In this case, the frames are transmitted such that the frames that the B-pictures depend on are transmitted first. This is referred to as the coded order of the frames.

The rules for how a decoder converts frames from the coded order to the display order are stated in section 5.4 of SMPTE 421M. In brief, if B-frames may be present in the coded bit stream, a hypothetical decoder implementation needs to buffer one additional decoded frame. When an I-frame or a P-frame is received, the frame can be decoded immediately but it is not displayed until the next I-frame or P-frame is received. However, B-frames are displayed immediately.

FIG. 4 specifically illustrates the timing relationship between the capture of frames, their coded order, and the display order of the decoded frames, when B-frames are present in the coded bit stream. In the specific example featured in FIG. 4, the display of frame P4 is delayed until frame P7 is received, while frames B2 and B3 are displayed immediately. On the other hand, if B-pictures are not present, the coded order and the display order are identical, and frames can then be displayed without additional delay.

B. Exemplary System

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (or declarative content) that performs specified tasks when executed on a processing device or devices (e.g., CPU or CPUs). The program code can be stored in one or more computer readable media.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

Figure 5:
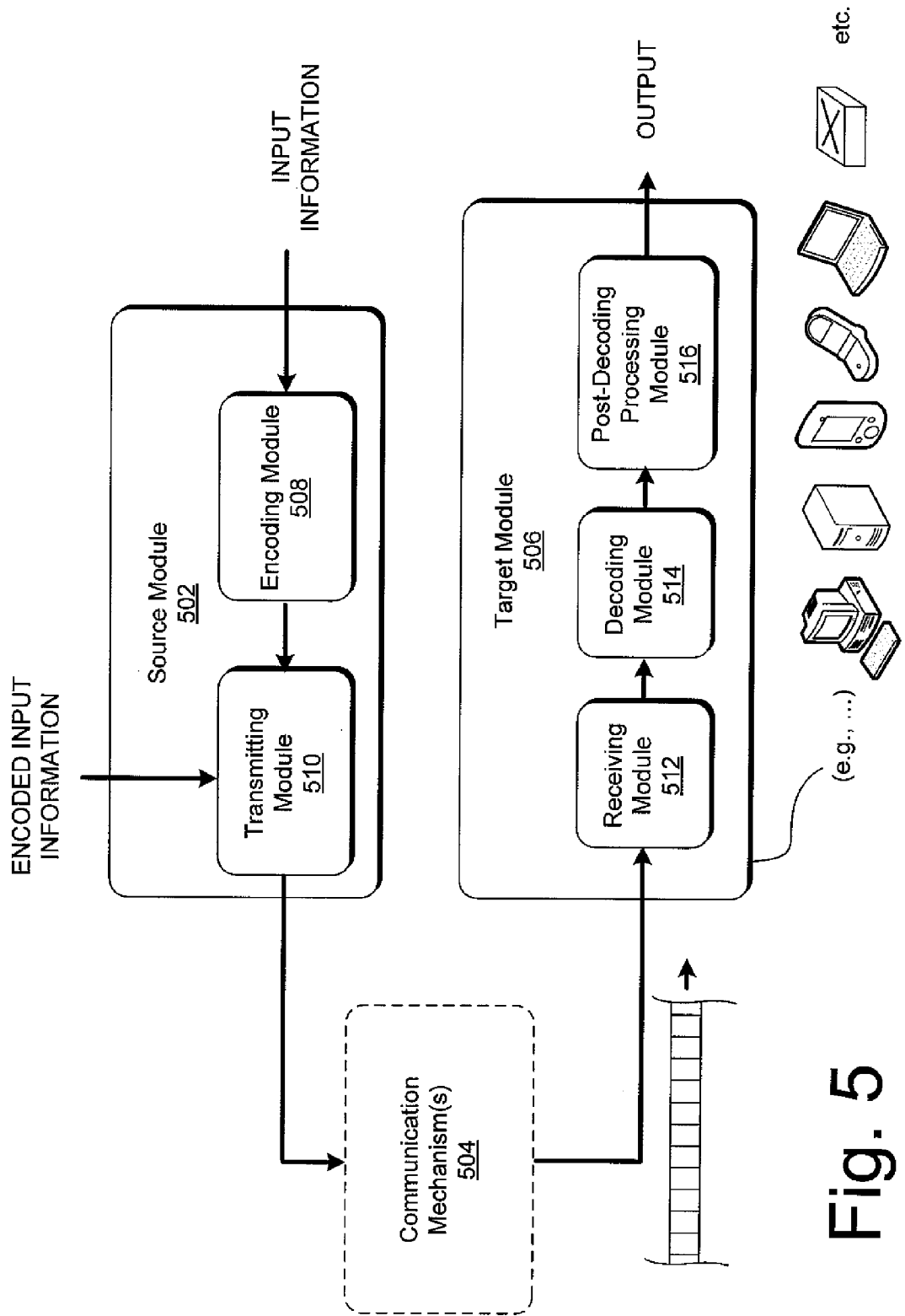
FIG. 5 shows an exemplary system for processing media information according to the present invention.

FIG. 5 shows an overview of one exemplary system 500 which can make use of the RTP payload format described herein.

The system includes a source module 502 which transmits media information via a communication mechanism (or mechanisms) 504 to a target module 506. The source module 502 and target module 506 can represent a wide variety of devices or other functionality, including any kind of computer. For instance, the source module 502 may represent a server and the target module 506 may represent a client computer. However, many other scenarios are possible. In another scenario, the source module 502 and target module 506 may represent two personal computer devices, e.g., which communicate with each other via an intermediate server switchboard, via P2P, and so on. In another scenario, the source module 502 and the target module 506 may represent two server-type computers. In another scenario, the source module 502 and/or the target module 506 may represent other kinds of computing devices, such as wearable processing devices, mobile telephone devices, set-top boxes, game consoles, audio playback devices, any kind of video disk players, digital video recorders (DVRs), and so on. Again, many other permutations are possible. In general, in one case, the source module 502 is remote from the target module 506. In another scenario, the source module 502 is local with respect to the target module 506.

The communication mechanism 504 can represent any kind of channel or combination of channels for exchanging information among devices. It can represent a local area network (LAN), a wide area network (WAN, e.g., the Internet), or combination thereof. It can be physically implemented using any kind and combination of links, such as hardwired conductive links, wireless links, power lines, and so forth. The communication mechanism 504 can also include any combination of network-related equipment, such as various routers, gateways, name servers, and so forth.

As broadly shown in FIG. 5, the source module can include an encoding module 508 for converting a stream of media information (or other kind of data) into the required standard, which in this case is VC-1. A transmitting module 510 can encapsulate the VC-1 media information using the payload format to be described in section C of this disclosure. In other words, this process comprises organizing the information in the VC-1 stream into RTP packets according to the rules described below. FIG. 5 also shows an arrow directly leading into the transmitting module 510, which indicates that the transmitting module can receive VC-1 media information without having to execute the 1 encoding performed by the encoding module 508. In still another scenario, the transmitting module 510 can receive VC-1 information that has already been converted to the desired VC-1 RTP payload format, and, as such, this information is immediately ready for transmission. In any event, the transmitting module 510 sends the RTP packets over the communication mechanism 504 to the target module 506.

The target module 506 includes a receiving module 512 for receiving the RTP packets from the communication mechanism 504. In connection therewith, the receiving module 512 can perform a number of functions, such as buffering the stream of RTP packets, reordering information in the stream of packets if necessary, addressing the loss of information in the stream of packets, and so forth (to be discussed in greater detail in the next section). The receiving module 512 passes the received media information to the decoding module 514, which decodes the media information. The decoding module 514 can pass the decoded information that it produces to any kind of post-processing functionality, represented by a post-processing module 516. The post-processing module 516 performs its ascribed processing tasks on the decoded information for eventual output. In the context of media information, the output can represent the generation of an audio and/or video presentation. The output device (not shown) may comprise a speaker, and/or television screen, and/or computer monitor, and so forth.

In another scenario, the source module 502 can store media information in the desired payload format on one or more computer readable media. The target module 506 can read the media information from the one or more computer readable media and perform prescribed operations on the media information. In this scenario, the communication mechanism 504 can be construed broadly to represent the above-referenced one or more computer readable media. Exemplary types of computer readable media include various types of magnetic storage devices, optical devices, solid state storage devices, and so forth.

C. Exemplary Payload Format

C.1. Encapsulation of VC-1 Format Bit Streams in RTP

C.1.1. Overview of the Payload Format and the Concept of Access Units

Figure 6:
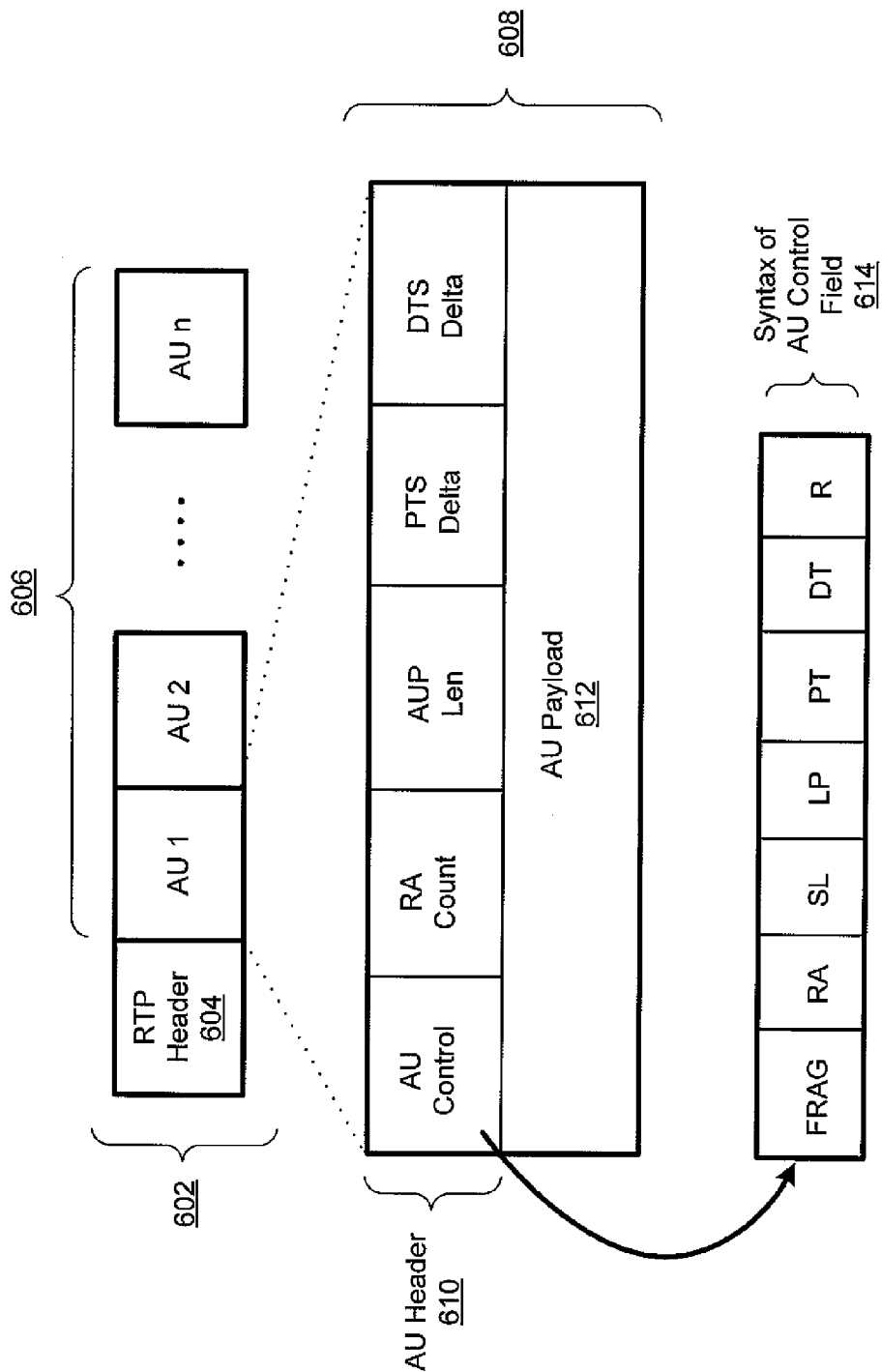
FIG. 6 shows an exemplary structure of an RTP payload format for VC-1.

FIG. 6 shows an exemplary RTP packet 602 which embodies an exemplary payload format tailored for the VC-1 standard. It includes an RTP header portion 602 and an integral number of byte-aligned Access Units (AUs) 606. Each Access Unit can start with an AU header (to be defined below), and is followed by a variable length payload. In one exemplary implementation, an AU payload contains data belonging to exactly one VC-1 frame, such that data from different VC-1 frames will always be in different AUs. For example, each AU payload shown in FIG. 6 can contain a respective VC-1 frame. (Note that, if the combined size of the AUs for those VC-1 frames is less than the maximum transmission unit (MTU) size of the RTP packet, it may be beneficial to combine the AUs into a single RTP packet; this provision allows the overhead of the RTP encapsulation to be amortized across the multiple AUs.) However, as discussed in section C.1.2 below, frames can be also be fragmented among multiple AUs.

FIG. 6 also shows the composition of an exemplary Access Unit (AU) 608. This AU 608 includes an AU header portion 610 and a variable length AU payload 612. The AU header portion 610 includes various control information that governs the processing of media information within the AU 608. The AU header 610 conveys the control information in various control fields, including an AU Control field 614, an RA Count field, an AUP Len field, a PTS Delta field, and a DTS Delta field. FIG. 6 enumerates the exemplary contents of the "AU control field" 614. Later sections describe the role served by each field of control information in the AU header 610.

The following exemplary general characteristics may apply to the contents of an AU payload:

For the Advanced profile, the AU payload can contain VC-1 bit stream data in EBDU format (e.g., the bit stream can use the byte-stuffing encapsulation mode defined in Annex E of SMPTE 421M.)

For the Advanced profile, the AU payload can contain multiple EBDUs, e.g., a sequence layer header, an entry point header, a picture header, and multiple slices and associated user-data. All slices and their corresponding macroblocks in an AU should belong to the same video frame.

If the data in an AU (EBDUs in the case of Advanced profile and frames in the case of Simple and Main profiles) does not end at an octet boundary, up to 7 zero-valued padding bits can be added to achieve octet-alignment.

When VC-1 Simple or Main profiles are used, the AU payload should start with a picture header, except when the AU payload contains a fragmented frame (as described below).

C.1.2. Fragmentation of VC-1 Frames

As indicated above, each AU payload can contain a complete VC-1 frame. However, if adding a complete frame to an AU payload causes the RTP packet to exceed the MTU size, the frame can be fragmented into multiple AUs to avoid IP-level fragmentation. A FRAG field in the AU header (discussed in greater detail below) can be set to indicate that the AU contains a fragmented frame.

The following exemplary characteristics may apply to the fragmentation of frames within AU payloads:

For the Advanced profile, an AU payload that does not contain a fragmented frame, or that contains a first fragment of a frame, can start at an EBDU boundary.

As noted above, for Simple and Main profiles, the AU payload can begin with the start of a picture header, except when the AU payload contains a fragmented frame. In the case of Simple and Main profiles, since the blocks and macroblocks are not byte-aligned, the fragmentation boundary may be chosen arbitrarily.

If the Advanced profile is used, an AU payload that contains a fragment of a frame other than the first fragment, can start at an EBDU boundary, such as at the start of a slice. However, note that slices are only defined for the Advanced profile, and are not always used. Therefore, in certain circumstances it may not be possible to continue a fragmented frame at an EBDU boundary. If the AU cannot start at an EBDU boundary, it may begin at a block or macroblock. But note that blocks and macroblocks are not BDUs (and thus have no Start Code) and are not byte-aligned. One can determine if an AU payload starts at an EBDU boundary by inspecting the first three bytes of the AU payload. The AU payload starts at an EBDU boundary if the first three bytes are identical to the Start Code Prefix (e.g., 0x00, 0x00, 0x01).

If an RTP packet contains an AU with the last fragment of a frame, in one exemplary implementation, additional AUs are not included in the RTP packet.

If the PTS Delta field in the AU header is present (to be described below), each fragment of a frame should have the same presentation time.

If the DTS Delta field in the AU header is present (to be described below), each fragment of a frame should have the same decode time.

C.1.3. Time Stamp Considerations

A number of considerations may affect the temporal-related processing of media information in an RTP packet. Exemplary such considerations are identified as follows:

In one exemplary implementation, the source module 502 can transmit video frames in a coded order. As discussed above in the context of FIG. 4, a coded order implies that no frames are dependent on subsequent frames.

The RTP timestamp field (e.g., the "timestamp" field in the RTP header 102 of FIG. 1) can be set to the presentation time defined for a video frame contained in a first AU in the RTP packet. The presentation time can be used as the timestamp field in the RTP header because it differs from the sampling instant of the frame only by an arbitrary constant offset.

If a video frame in an AU has a presentation time that differs from the RTP timestamp field, then the presentation time can be specified using the PTS Delta field in the AU header. Since the RTP timestamp field should be identical to the presentation time of the first video frame, this scenario can only happen if an RTP packet contains multiple AUs. The syntax of the PTS Delta field is defined in greater detail below.

The decode time of a VC-1 frame monotonically increases when the video frames are transmitted in the coded order. If B-pictures will not be present in the coded bit stream, then the decode time of a frame is equal to the presentation time of the frame.

If B-pictures may be present in the coded bit stream, then the decode times of frames can be determined as follows:
 (1) Non-B frames: The decode time is equal to the presentation time of the previous non-B frame in the coded order.
 (2) B-frames: The decode time is equal to the presentation time of the B-frame.

As an example, once again consider FIG. 4. Assume that the decode time of non-B frame P4 is 4 time units, which is equal to the presentation time of the previous non-B frame in the coded order, which is P1. On the other hand, the decode time of B-frame B2 is 5 time units, which is identical to its presentation time.

If the decode time of a video frame differs from its presentation time, then the decode time is specified using the DTS Delta field in the AU header. The syntax of the DTS Delta field is defined below.

Generally, knowing if the stream will contain B-pictures may help the target module 506 allocate resources more efficiently and can reduce delay, as an absence of B-pictures in the stream implies that no reordering of frames will be needed between the decoding process and the display of the decoded frames. This time savings may be particularly useful for interactive applications.

The receiver can assume that the coded bit stream may contain B-pictures in the following cases:
 (1) Advanced profile: If the value of the "bpic" media type parameter is 1, or if the "bpic" parameter is not specified. The "bpic" parameter is a MIME (Multipurpose Internet Mail Extensions) parameter and is described below.
 (2) Main profile: If a MAXBFRAMES field in a STRUCT_C decoder initialization parameter has a non-zero value. STRUCT_C is conveyed in a "config" media type parameter, as discussed in greater detail below. STRUCT_C is defined in Annex J of SMPTE 421M.

Note that the Simple profile does not use B pictures.

C1.4. Random Access Points

As described in section A, an entry point (also referred to as a random access point) defines a point in a stream in which the decoder module 514 can gain "entry" to the stream to begin processing it, or to resume processing it after an interruption. Two consecutive entry points define any entry point segment. This means that, in the event of lost RTP packets, the decoder module 514 may be unable to decode frames until it reaches the next entry point in the stream.

An entry point header demarcates an entry point segment. The entry point header contains information that is needed by the decoding module 514 to decode the frames in an entry point segment identified by the entry point header. The first frame after an entry point header is a random access point (i.e., an entry point) into the coded bit stream. The Simple and Main profiles do not have entry point headers. For those profiles, each I-picture serves as a random access point.

The RTP payload format defines a field called "RA Count," as indicated in the AU header 610 of FIG. 6. The RA Count field allows the receiver module 512 to detect that an RTP packet that has been lost contained a random access point. More specifically, the source module 502 can increment (e.g., modulo 256) the value for the RA Count field for every random access point, and insert such value in the RA Count field for each respective AU. The target module 506 can use this count information to detect the loss of media information, e.g., by detecting a discontinuity in RA Count values in the media information that it receives. For additional details pertaining to this topic, see the definition of "RA Count" in section C.2.2.

The RTP payload format also defines a bit called the "RA" flag in an AU Control field, as indicated in the AU control field 614 of the AU header 610. This bit is set to 1 only for those AU's that contain a random access point. The RA flag thus makes it easier to determine if an AU contains a random access point. The RA bit is described in additional detail in section C.2.3.

C.1.5. Removal of HRD Parameters

A sequence layer header in the Advanced profile can include up to 31 leaky bucket parameter sets for the Hypothetical Reference Decoder (HRD). The leaky bucket parameter sets describe different transmission scenarios that can potentially apply to the to transmission of media information to the target module 506. More specifically, each leaky bucket parameter set specifies a possible peak transmission bit rate (HRD RATE) and a decoder buffer capacity (HRD_BUFFER). For each leaky bucket parameter set in the sequence layer header, there is also a parameter in the entry point header that specifies an initial fullness (HRD_FULL) of the leaky bucket.

In some circumstances, the source module 502 (or other sender entity) may already know the actual peak transmission rate at which media information is sent to the target module 506. In this case, the source module 502 can remove all leaky bucket parameter sets from the sequence layer header except for the parameter set that corresponds to the actual peak transmission rate. When this is done, however, the source module 502 should also remove the corresponding HRD_FULL parameter in the entry point header. Removing leaky bucket parameter sets, as described above, may significantly reduce the size of the sequence layer headers and the entry point headers.

C.1.6. Repeating the Sequence Layer Header

The source module 502 can improve robustness against loss of RTP packets by frequently repeating the sequence layer header in the bit stream. That is, through this strategy, the loss of a sequence layer header can potentially be remedied using another sequence layer header that has been successfully received (and which contains the same information as the lost sequence layer header). In this strategy, the number of leaky bucket parameters in the sequence layer header and the entry point headers can be reduced to one using the technique described in the immediately preceding section (section C.1.5). This provision will help reduce the overhead caused by repeating the sequence layer header.

Note that any data in the VC-1 bit stream, including repeated copies of the sequence header itself, should be accounted for when computing the leaky bucket parameter for the HRD.

Further note that if the value of a TFCNTRFLAG flag in the sequence layer header is 1, each picture header contains a frame counter field (TFCNTR). Each time the sequence layer header is inserted into the bit stream, the value of this counter should be reset.

Finally, the AU Control field 614 defines a bit called the "SL" flag, as indicated in FIG. 6. This SL bit allows the target module 506 to detect that a lost RTP packet contained a new sequence layer header. That is, the source module 502 (or other entity) is can toggle this bit when a sequence layer header is transmitted, but only if that header is different from the most recently transmitted sequence layer header. By noting changes in the value of this bit, the target module 506 can determine whether a new sequence layer header has been sent, and whether such a sequence layer header may have been potentially lost. The SL bit is discussed further in section C.2.3.

C.1.7. Signaling of MIME Format Parameters

When the above-described RTP payload format is used with SDP (Session Description Protocol), decoder initialization parameters can be signaled in SDP using the MIME parameters specified in section C.3.1. Section C.3.2 specifies how to map the MIME parameters to SDP. Section C.3.3 defines rules specific to the SDP Offer/Answer model, and section C.3.4 defines rules for when SDP is used in a declarative style. By way of background, the Session Description Protocol (or SDP) specification sets forth a protocol for describing the details of a session for streaming media information. Note Handley, M. and V. Jacobson, "SDP: Session Description Protocol," RFC 2327, April 1998. The Multipurpose Internet Mail Extensions (or MIME) specification sets forth rules for formatting messages for transmission over the Internet. The SDP Offer/Answer model is described in Rosenberg, J. and H. Schulzrinne, "An Offer/Answer Model with Session Description Protocol (SDP)," RFC 3264, June 2002.

When the Advanced profile is used, the decoder initialization parameters can be changed by inserting a new sequence layer header or an entry point header in the coded bit stream. By contrast, when Simple or Main profiles are used, the decoder initialization parameters are not changed through the coded bit stream. Any changes to the decoder initialization parameters can be made through out-of-band means, e.g., by updating the SDP.

For the Advanced profile, note that the sequence layer header specifies the VC-1 is level, the maximum size of the coded pictures and optionally also the maximum frame rate. The media type parameters "level," "width," "height" and "framerate" specify upper limits for these parameters. Thus, the sequence layer header can specify values that that are lower than the values of the media type parameters "level," "width," "height" or "framerate," but the sequence layer header should not exceed the values of any of these media type parameters.

C.1.8 The "Mode=1" Media Type Parameter

The sequence layer header never changes in certain applications using the Advanced profile. This can be signaled with a media type parameter "mode=1." (The "mode" parameter is defined in section C.3.1.) The "mode=1" parameter serves as a hint to the target module 506 that all sequence layer headers in the bit stream will be identical. If "mode=1" is signaled and a sequence layer header is present in the coded bit stream, then this sequence layer header should be identical to the sequence layer header specified by the "config" media type parameter.

Since the sequence layer header never changes in "mode=1," the source module 502 or other RTP sender can remove it from the bit stream. Note, however, that if the value of the TFCNTRFLAG flag in the sequence layer header is 1, each picture header contains a frame counter field (TFCNTR). This field is reset each time the sequence layer header occurs in the bit stream. If the RTP sender chooses to remove the sequence layer header, then it should ensure that the resulting bit stream is still compliant with the VC-1 specification (e.g., by adjusting the TFCNTR field, if necessary.)

C1.9. The "Mode=3" Media Type Parameter

In other circumstances, both the sequence layer header and the entry point header is never change in the Advanced profile. This can be signaled with the MIME parameter "mode=3." The same rules apply to "mode=3" as for "mode=1," described in section C.1.8. Additionally, if "mode=3" is signaled, then the source module 502 or other RTP sender can "compress" the coded bit stream by not including both sequence layer headers and entry point headers in the RTP packets.

The receiving module 512 (or other functionality) can "decompress" the coded bit stream by re-inserting the removed entry point headers prior to delivering the coded bit stream to the decoding module 514. The sequence layer header does not need to be decompressed by the receiving module 512, since it never changes.

If "mode=3" is signaled and the receiving module 512 receives a complete AU or the first fragment of an AU, and the RA bit is set to 1 but the AU does not begin with an entry point header, then this indicates that the entry point header has been "compressed." In that case, the receiving module 512 can insert an entry point header at the beginning of the AU. When inserting the entry point header, the receiving module 512 can use the header that is specified by the MIME "config" parameter.

C.2. RTP Payload Format Syntax

C.2.1. RTP Header Usage

Figure 1:
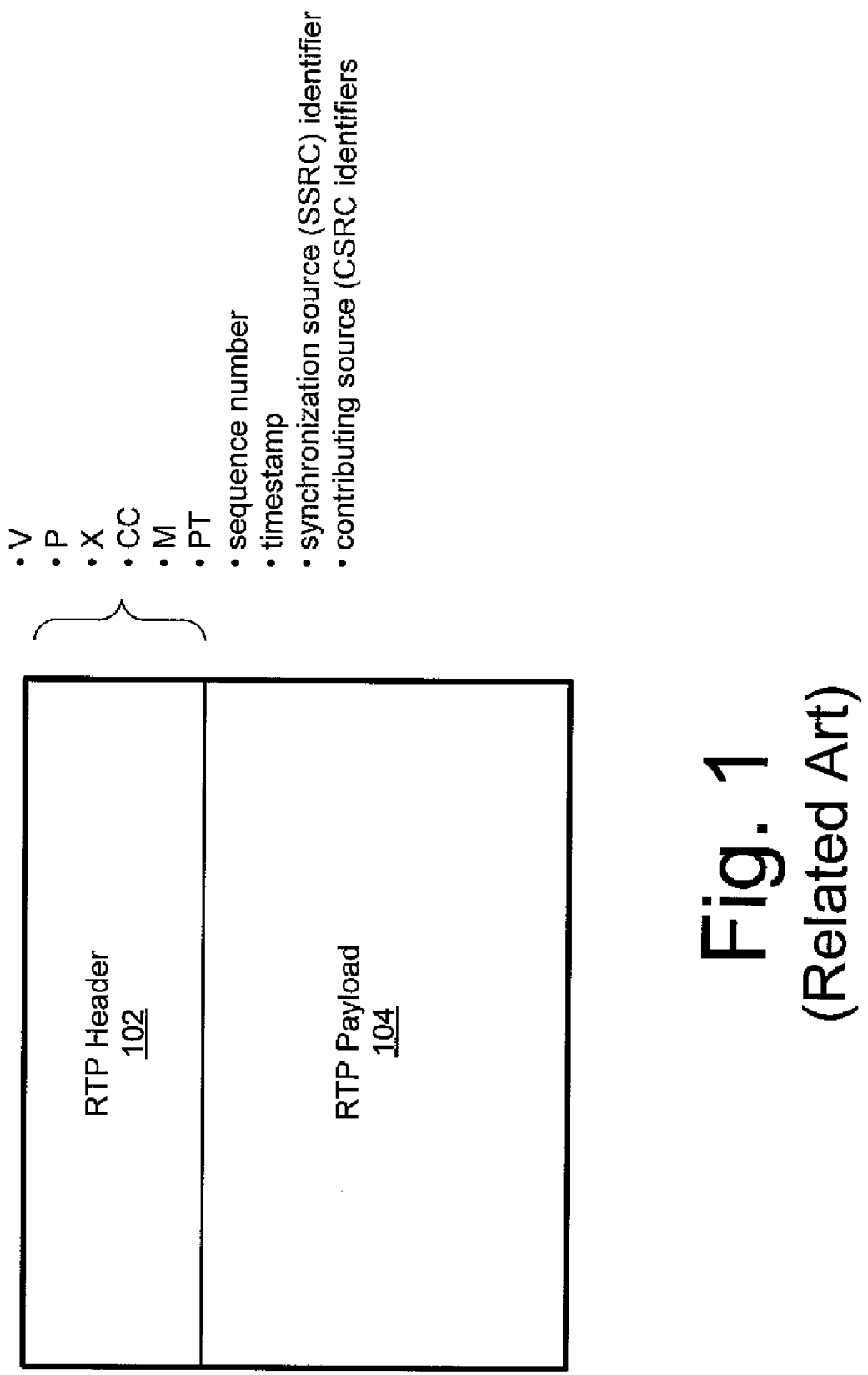
FIG. 1 shows an exemplary RTP packet.

The format of the RTP header is specified in RFC 3550, and is generally represented by FIG. 1. The fields of the fixed RTP header have their usual meaning, which is defined in RFC 3550 and by the RTP profile in use, with the following additional notes:

Marker bit (M): 1 bit

This bit is set to 1 if the RTP packet contains an Access Unit containing a complete VC-1 frame, or the last fragment of a VC-1 frame.

Payload type (PT): 7 bits

This description does not assign an RTP payload type for the RTP payload format set forth herein. The assignment of a payload type can be performed either through the RTP profile that is used or in a dynamic manner.

Sequence Number: 16 bits

The target module 506 can use the sequence number field to recover the coded order of the VC-1 frames. (A typical VC-1 decoder will require the VC-1 frames to be delivered in coded order.) When VC-1 frames have been fragmented across RTP packets, the target module 506 can use the sequence number field to ensure that no fragment is missing.

Timestamp: 32 bits

The RTP timestamp is set to the presentation time of the VC-1 frame in the first Access Unit. In one exemplary implementation, a 90 kHz clock rate can be used.

C.2.2. AU Header Syntax

As discussed above, FIG. 6 shows the composition of an exemplary Access Unit 608. The Access Unit 608 includes the AU header 610 and the AU payload 612. The Access Unit header 610 comprises a one-byte AU Control field, the RA Count field, and three other fields (AUP Len, PTS Delta, and DTS Delta). Any of these fields can be defined as mandatory or optional. For instance, in one exemplary implementation, the AU Control and RA Count fields are mandatory, while the remaining three fields are optional. All fields can be written in network byte order.

The structure of the AU header is defined in greater detail below:

AU Control: 8 bits

The usage of the AU Control field is defined in section C.2.3.

RA Count: 8 bits

Random Access Point Counter. This field defines a binary modulo 256 counter. The source module 502 or other sending entity can increment the value of this field by 1 each time it transmits an AU, providing that the RA bit in the AU Control field is set to 1. The initial value of this field is undefined and can be randomly selected.

AUP Len: 16 bits

Access Unit Payload Length. This field specifies the size, in bytes, of the payload 612 of the Access Unit. The field does not include the size of the AU header itself. The field should be included in each AU header in an RTP packet, except for the last AU header in the packet. If this field is not included, the payload of the Access Unit shall be assumed to extend to the end of the RTP payload.

PTS Delta: 32 bits

Presentation time delta. This field specifies the presentation time of the frame as a 2's complement offset (delta) from the timestamp field in the RTP header of this RTP packet. The PTS Delta field can use the same clock rate as the timestamp field in the RTP header.

This field should not be included in the first AU header in the RTP packet, because the RTP timestamp field specifies the presentation time of the frame in the first AU. If this field is not included, the presentation time of the frame can be assumed to be specified by the timestamp field in the RTP packet header.

DTS Delta: 32 bits

Decode time delta. This field specifies the decode time of the frame as a 2's complement offset (delta) between the presentation time and the decode time. Note that if the presentation time is larger than the decode time, this results in a value for the DTS Delta field that is greater than zero. The DTS Delta field should use the same clock rate as the timestamp field in the RTP header. If this field is not included, the decode time of is the frame can be assumed to be identical to the presentation time of the frame.

C.2.3. AU Control Field Syntax

The structure of the 8-bit AU Control field is shown in FIG. 6, and is described as follows:

FRAG: 2 bits

Fragmentation Information. This field indicates if the AU payload 612 contains a complete frame or a fragment of a frame. It can be set as follows:

0: The AU payload contains a fragment of a frame other than the first or last fragment.

1: The AU payload contains the first fragment of a frame.

2: The AU payload contains the last fragment of a frame.

3: The AU payload contains a complete frame (not fragmented.)

RA: 1 bit

Random Access Point indicator. This bit is set to 1 if the AU contains a frame that is a random access point. In the case of Simple and Main profiles, any I-picture is a random access point. In the case of Advanced profile, the first frame after an entry point header is a random access point. The media type parameter "mode=3" can be used to indicate that entry point headers are not transmitted at every random access point.

SL: 1 bit

Sequence Layer Counter. This bit can be toggled, that is, changed from 0 to 1 or from 1 to 0, if the AU contains a sequence layer header and if the sequence layer header is different from the most recently transmitted sequence layer header. Otherwise, the value of this bit is identical to the value of the SL bit in the previous AU. The initial value of this bit is undefined and can be randomly selected.

This bit can be set to 0 for the Simple and Main profile bit streams or if the sequence layer header in the Advanced profile never changes.

LP: 1 bit

Length Present. This bit can be set to 1 if the AU header includes the AUP Len field.

PT: 1 bit

PTS Delta Present. This bit can be set to 1 if the AU header includes the PTS Delta field.

DT: 1 bit

DTS Delta Present. This bit can be set to 1 if the AU header includes the DTS Delta field.

R: 1 bit

Reserved. This bit can be set to 0 and can be ignored by receivers.

The above-described information items expressed in the AU header and the AU control field are exemplary. In other implementations, additional information items can be added and/or any of the above-described information items can be omitted. One or more flags can be used to signal whether certain optional information items are present or omitted. Still other variations of the above-described syntax are possible.

C.3. RTP Payload Format Parameters

C.3.1 Media Type Registration

The media subtype for VC-1 is allocated from the standards tree. The top-level media type under which this payload format is registered is 'video'.

The receiver can ignore any unrecognized parameter.

Media type: video

Media subtype: vc1

Standard parameters:

profile:

This parameter is an integer number indicating the VC-1 profile. The following values are defined:

0: Simple profile;

1: Main profile; and

3: Advanced profile.

If the profile parameter is used to indicate properties of a coded bit stream, it indicates the VC-1 profile that a decoder has to support when it decodes the bit stream. If the profile parameter is used for capability exchange or in a session setup procedure, it indicates the VC-1 profile that the codec supports.

level:

This parameter is an integer specifying the level of the VC-1 profile. For Advanced profile, valid values are 0 to 4, which correspond to levels L0 to L4, respectively. For Simple and Main profiles, the following values are defined:

1: Low Level;

2: Medium Level; and

3: High Level (only valid for Main profile).

If the level parameter is used to indicate properties of a coded bit stream, it indicates the highest level of the VC-1 profile that a decoder has to support when it decodes the bit stream. Note that support for a level implies support for all numerically lower levels of the given profile. If the level parameter is used for capability exchange or in a session setup procedure, it indicates the highest level of the VC-1 profile that the codec supports.

Optional parameters:

config:

This parameter is a base16 (hexadecimal) representation of an octet string that expresses the decoder initialization parameters. (As to the general topic of base16 representation, note Josefsson, S., Ed., "The Base16, Base32, and Base64 Data Encodings," RFC 3548, July 2003.) Decoder initialization parameters can be mapped onto the base16 octet string in an MSB-first basis. The first bit of the decoder initialization parameters is located at the MSB of the first octet. If the decoder initialization parameters are not multiples of 8 bits, up to 7 zero-valued padding bits can be added to achieve octet alignment in the last octet.

For the Simple and Main profiles, the decoder initialization parameters are STRUCT_C, as defined in Annex J of SMPTE 421M. For the Advanced profile, the decoder initialization parameters are a sequence layer header directly followed by an entry-point header. The two headers are in EBDU format, meaning that they include Start Codes and use the encapsulation method defined in Annex E of SMPTE 421M.

width:

This parameter is an integer greater than zero, specifying the maximum horizontal size of the coded picture, in pixels. If this parameter is not specified, it defaults to the maximum horizontal size allowed by the specified profile and level.

height:

This parameter is an integer greater than zero, specifying the maximum vertical size of the coded picture in pixels. If this parameter is not specified, it defaults to the is maximum vertical size allowed by the specified profile and level.

bitrate:

The parameter is an integer greater than zero, specifying the peak transmission rate of the coded bit stream in bits per second. The number does not include the overhead caused by RTP encapsulation. That is, for instance, it does not include the AU headers, or any of the RTP, UDP or IP headers. If this parameter is not specified, it defaults to the maximum bit rate allowed by the specified profile and level. See the values for "RMax" in Annex D of SMPTE 421M.

buffer:

This parameter is an integer specifying the leaky bucket size, B, in milliseconds, required to contain a stream transmitted at the transmission rate specified by the bitrate parameter. This parameter is defined in the hypothetical reference decoder model for VC-1, in Annex C of SMPTE 421M. Note that this parameter relates to the codec bit stream only, and does not account for any buffering time that may be required to compensate for jitter in the network. If this parameter is not specified, it defaults to the maximum buffer size allowed by the specified profile and level. See the values for "BMax" and "RMax" in Annex D of SMPTE 421M.

framerate:

This parameter is an integer greater than zero, specifying the maximum number of frames per second in the coded bit stream, multiplied by 1000 and rounded to the nearest integer value. For example, 30000/1001 (approximately 29.97) frames per second is represented as 29970. If the parameter is not specified, it defaults to the maximum frame rate allowed by the specified profile and level.

bpic:

This parameter signals if B-pictures may be present when Advanced profile is used. If this parameter is present, and B-pictures may be present in the coded bit stream, this parameter is equal to 1. A value of 0 indicates that B-pictures shall not be present in the coded bit stream, even if the sequence layer header changes. In one implementation, this value can be included, with a value of 0, if no B-pictures will be included in the coded bit stream.

This parameter is not used with Simple and Main profiles. (For Main profile, the presence of B-pictures can be indicated by the MAXBFRAMES field in STRUCT_C decoder initialization parameter.) For Advanced profile, if this parameter is not specified, a value of 1 can be assumed.

mode:

This parameter is an integer specifying the use of the sequence layer header and the entry-point header. This parameter is only defined for Advanced profile. The following values are defined:

0: Both the sequence layer header and the entry-point header may change, and changed headers will be included in the RTP packets;

1: The sequence layer header specified in the config parameter never changes; and 3: The sequence layer header and the entry-point header specified in the config parameter never change.

If the mode parameter is not specified, a value of 0 can be assumed. The mode parameter should be specified if modes 1 or 3 apply to the VC-1 bit stream.

max-width, max-height, max-bitrate, max-buffer, max-framerate:

These parameters are defined for use in a capability exchange procedure. The parameters do not signal properties of the coded bit stream, but rather upper limits or preferred values for the "width," "height," "bitrate," "buffer" and "framerate" parameters.

Receivers that signal support for a given profile and level should support the maximum values for these parameters for that profile and level. For example, in one implementation, a receiver that indicates support for Main profile, Low level, should support a width of 352 pixels and height of 288 pixels, even if this requires scaling the image to fit the resolution of a smaller display device.

A receiver may use any of the max-width, max-height, max-bitrate, max-buffer and max-framerate parameters to indicate preferred capabilities. For example, a receiver may choose to specify values for max-width and max-height that match the resolution of its display device, since a bit stream encoded using those parameters would not need to be rescaled.

If any of the max-width, max-height, max-bitrate, max-buffer and max-framerate parameters signal a capability that is less than the required capabilities of the signaled profile and level, then the parameter can be interpreted as a preferred value for that capability.

Any of the parameters may also be used to signal capabilities that exceed the required capabilities of the signaled profile and level. In that case, the parameter can be interpreted as the maximum value that can be supported for that capability.

In one exemplary implementation, when more than one parameter from the set (max-width, max-height, max-bitrate, max-buffer and max-framerate) is present, all signaled capabilities should be supported simultaneously.

In one exemplary implementation, a sender or receiver should not use these parameters to signal capabilities that meet the requirements of a higher level of the VC-1 profile than the one specified in the "level" parameter, if the sender or receiver can support all the properties of the higher level, except if specifying a higher level is not allowed due to other restrictions. (As an example of such a restriction, in the SDP Offer/Answer model, the value of the level parameter that can be used in an Answer is limited by what was specified in the Offer.)

max-width:

This parameter is an integer greater than zero, specifying a horizontal size for the coded picture, in pixels. If the value is less than the maximum horizontal size allowed by the profile and level, then the value specifies the preferred horizontal size. Otherwise, it specifies the maximum horizontal size that is supported. If this parameter is not specified, it defaults to the maximum horizontal size allowed by the specified profile and level.

max-height:

The parameter is an integer greater than zero, specifying a vertical size for the coded picture, in pixels. If the value is less than the maximum vertical size allowed by the profile and level, then the value specifies the preferred vertical size. Otherwise, it specifies the maximum vertical size that is supported. If this parameter is not specified, it defaults to the maximum vertical size allowed by the specified profile and level.

max-bitrate:

This parameter is an integer greater than zero, specifying a peak transmission rate for the coded bit stream in bits per second. The number does not include the overhead caused by RTP encapsulation, e.g., it does not include the AU headers, or any of the RTP, UDP or IP headers.

If the value is less than the maximum bit rate allowed by the profile and level, then the value specifies the preferred bit rate. Otherwise, it specifies the maximum bit rate that is supported. If this parameter is not specified, it can default to the maximum bit rate allowed by the specified profile and level. See the values for "RMax" in Annex D of SMPTE 421M.

max-buffer:

This parameter is an integer specifying a leaky bucket size, B, in milliseconds, required to contain a stream transmitted at the transmission rate specified by the max-bitrate parameter. This parameter is defined in the hypothetical reference decoder model for VC-1, in Annex C of SMPTE 421M. Note that this parameter relates to the codec bit stream only, and does not account for any buffering time that may be required to compensate for jitter in the network.

If the value is less than the maximum leaky bucket size allowed by the max-bitrate parameter and the profile and level, then the value specifies the preferred leaky bucket size. Otherwise, it specifies the maximum leaky bucket size that is supported for the bit rate specified by the max-bitrate parameter. If this parameter is not specified, it defaults to the maximum buffer size allowed by the specified profile and level. See the values for "BMax" and "RMax" in Annex D of SMPTE 421M.

max-framerate:

The value is an integer greater than zero, specifying a number of frames per second for the coded bit stream. The value is the frame rate multiplied by 1000 and rounded to the nearest integer value. For example, 30000/1001 (approximately 29.97) frames per second is represented as 29970.

If the value is less than the maximum frame rate allowed by the profile and level, then the value specifies the preferred frame rate. Otherwise, it specifies the maximum frame rate that is supported. If the parameter is not specified, it defaults to the maximum frame rate allowed by the specified profile and level C.3.2 Mapping of Media Type Parameters to SDP The information carried in the media type specification has a specific mapping to fields in the Session Description Protocol (SDP). If SDP is used to specify sessions using this payload format, one exemplary mapping is performed as follows:

The media name in the "m=" line of SDP is video (the type name).

The encoding name in the "a=rtpmap" line of SDP is vc1 (the subtype name).

The clock rate in the "a=rtpmap" line is 90000.

The required parameters "profile" and "level" should be included in the "a=fmtp" line of SDP. These parameters are expressed in the form of a semicolon separated list of parameter=value pairs.

The optional parameters "config," "width," "height," "bitrate," "buffer," "framerate," "bpic," "mode," "max-width," "max-height," "max-bitrate," "max-buffer" and "max-framerate," when present, can be included in the "a=fmtp" line of SDP.

These parameters are expressed in the form of a semicolon separated list of parameter=value pairs:

a—fmtp:<dynamic payload type> <parameter name>=<value>[, <value>] [; <parameter name>=<value>].

Any unknown parameters to the device that uses the SDP can be ignored. For example, parameters defined in later specifications may be copied into the SDP and can be ignored by receivers that do not understand them.

C.3.3 Usage with the SDP Offer/Answer Model

When VC-1 is offered over RTP using SDP in an Offer/Answer model for negotiation for unicast usage, the following rules may apply. As to the general topic of the Offer/Answer model, note, for instance, Rosenberg, J. and H. Schulzrinne, "An Offer/Answer Model with Session Description Protocol (SDP)," RFC 3264, June 2002.

The "profile" parameter can be used symmetrically, that is, the answerer can either maintain the parameter or remove the media format (payload type) completely if the offered VC-1 profile is not supported.

The "level" parameter specifies the highest level of the VC-1 profile supported by the codec. In one exemplary implementation, the answerer should not specify a numerically higher level in the answer than what was specified in the offer. The answerer may specify a level that is lower than what was specified in the offer, that is, the level parameter can be "downgraded."

If the offer specifies the sendrecv or sendonly direction attribute, and the answer downgrades the level parameter, this may require a new offer to specify an updated "config" parameter. If the "config" parameter cannot be used with the level specified in the answer, then the offerer can initiate another Offer/Answer round, or not use media format (payload type).

The parameters "config," "bpic," "width," "height," "framerate," "bitrate," "buffer" and "mode," describe the properties of the VC-1 bit stream that the offerer or answerer is sending for this media format configuration. In the case of unicast usage and when the direction attribute in the offer or answer is recvonly, the interpretation of these parameters is undefined and they should not be used.

The parameters "config," "width," "height," "bitrate" and "buffer" should be specified when the direction attribute is sendrecv or sendonly.

The parameters "max-width," "max-height," "max-framerate," "max-bitrate" and "max-buffer" may be specified in an offer or an answer, and their interpretation is as follows:

When the direction attribute is sendonly, the parameters describe the limits of the VC-1 bit stream that the sender is capable of producing for the given profile and level, and for any lower level of the same profile.

When the direction attribute is recvonly or sendrecv, the parameters describe properties of the receiver implementation. If the value of a property is less than what is allowed by the level of the VC-1 profile, then it can be interpreted as a preferred value and the sender's VC-1 bit stream should not exceed it. If the value of a property is greater than what is allowed by the level of the VC-1 profile, then it can be interpreted as the upper limit of the value that the receiver accepts for the given profile and level, and for any lower level of the same profile.

For example, if a recvonly or sendrecv offer specifies "profile=0; level=1; max-bitrate=48000," then 48 kbps is merely a suggested bit rate, because all receiver implementations of Simple profile, Low level, are required to support bit rates of up to 96 kbps. Assuming that the offer is accepted, the answerer should specify "bitrate=48000" in the answer, but any value up to 96000 is allowed. But if the offer specifies "max-bitrate=200000," this means that the receiver implementation supports a maximum of 200 kbps for the given profile and level (or lower level.) In this case, the answerer is allowed to answer with a bitrate parameter of up to 200000.

If an offerer wishes to have non-symmetrical capabilities between sending and receiving, e.g., use different levels in each direction, then the offerer has to offer different RTP sessions. This can be done by specifying different media lines declared as "recvonly" and "sendonly," respectively.

For streams being delivered over multicast, the following additional rules may apply:

The "level" parameter specifies the highest level of the VC-1 profile used by the participants in the multicast session. In one implementation, the value of this parameter should not be changed by the answerer. Thus, a payload type can either be accepted unaltered or removed.

The parameters "config," "bpic," "width," "height>" "framerate," "bitrate," "buffer" and "mode," specify properties of the VC-1 bit stream that will be sent, and/or received, on the multicast session. The parameters may be specified even if the direction attribute is recvonly. In one exemplary implementation, the values of these parameters should not be changed by the answerer. Thus, a payload type can either be accepted unaltered or removed.

The values of the parameters "max-width," "max-height," "max-framerate," "max-bitrate" and "max-buffer: should be supported by the answerer for all streams declared as sendrecv or recvonly. Otherwise, one of the following actions can be performed: the media format is removed, or the session rejected.

C.3.4 Usage in Declarative Session Descriptions

When VC-1 is offered over RTP using SDP in a declarative style, as in RTSP or SAP, the following rules may apply. As to RTSP, note generally Schulzrinne, H., Rao, A., and R. Lanphier, "Real Time Streaming Protocol (RTSP)," RFC 2326, April 1998. As to SAP, note generally Handley, M., Perkins, C., and E. Whelan, "Session Announcement Protocol," RFC 2974, October 2000.

The parameters "profile" and "level" indicate only the properties of the coded bit stream. They do not imply a limit on capabilities supported by the sender.

The parameters "config," "width", "height," "bitrate" and "buffer" should be specified.

In one exemplary implementation, the parameters "max-width," "max-height," "max-framerate," "max-bitrate" and "max-buffer" should not be used.

An example of media representation in SDP is as follows (Simple profile, Medium level);
m=video 49170 RTP/AVP 98
a=rpmap:98 vc1/90000
a=fmtp:98 profile=0; level=2; width=352; height=288; framerate=115000;
bitrate=384000; buffer=2000; config=4e291800

D. Exemplary Processes

Figure 7:
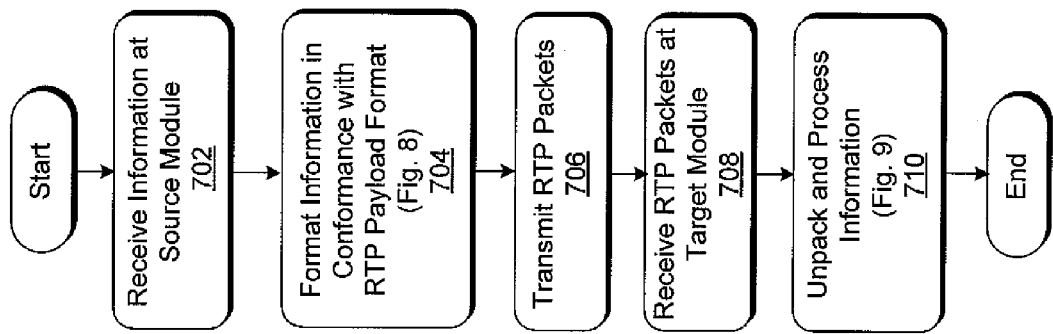
FIGS. 7-9 show exemplary procedures that explain the operation of the system of FIG. 5.
Figure 8:
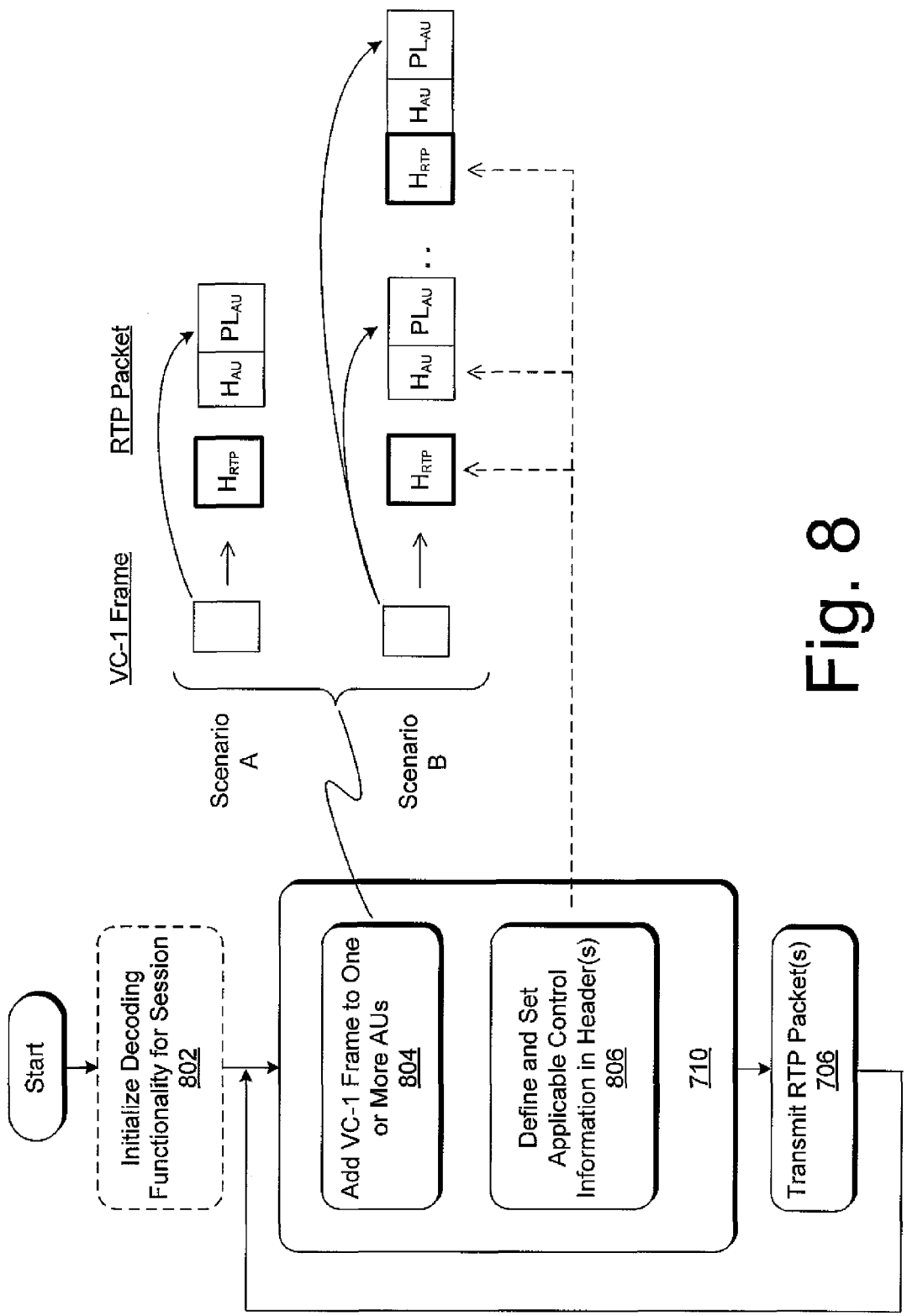
Figure 9:
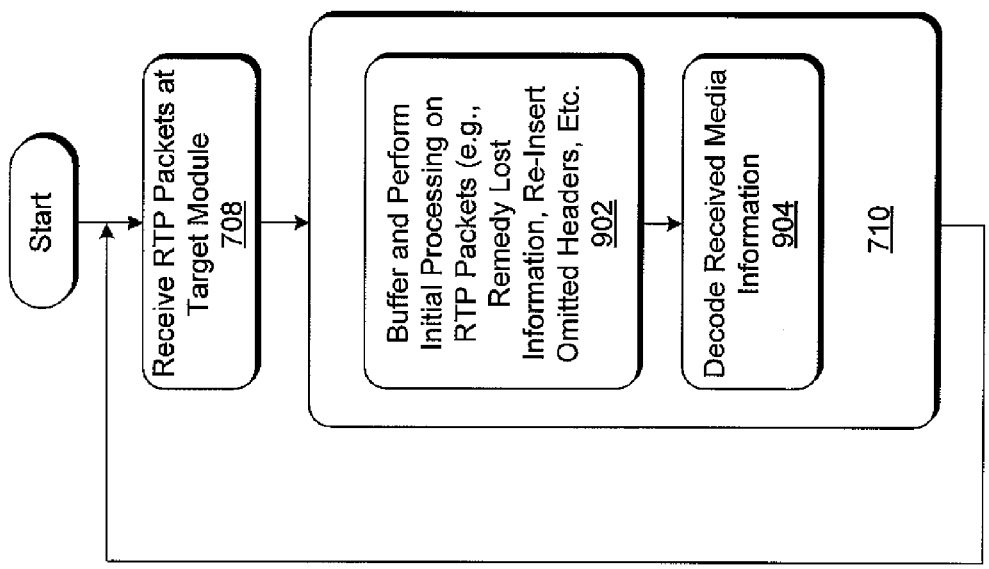

FIGS. 7-9 show procedures that explain an exemplary manner of operation of the system 500 shown in FIG. 5. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

D.1. Overview

To begin with, FIG. 7 shows a procedure 700 that provides an overview of the end-to-end processing shown in FIG. 5, involving the encoding of media information, the it transmission of the media information, and the decoding of the received media information.

In step 702, the source module 502 receives media information. In one case, this process can comprise receiving media information that is in a raw format or some other non-VC-1 format, and subsequently converting this information into the VC-1 format. In another case, this process can comprise receiving media information that has already been converted into the VC-1 format.

In step 704, the source module 502 formats the media information in a manner which is conformant with the RTP payload format described above. That is, step 704 produces a series of RTP packets that contain VC-1 information expressed in the desired RTP payload format. FIG. 8, discussed below, provides additional information regarding the formatting performed in step 704. Alternatively, the source module 502 can receive VC-1 media information that has already been converted into the desired RTP payload format.

In step 706, the source module 508 transmits the RTP packets over the communication mechanism 504. The communication mechanism 504 can comprise a network or combination of networks of any kind. Or the communication mechanism 504 can loosely represent the transfer of any kind of physical computer readable media, and so forth.

In step 708, the target module 506 receives the RTP packets.

In step 710, the target module 506 processes the RTP packets. This can involve 8 using the receiving module 512 in FIG. 5 to perform initial processing of the RTP packets, followed by using the decoding module 514 to decode the media information expressed in the RTP packets. Step 710 culminates in any kind of output of processed media information. FIG. 9, discussed below, provides additional information regarding the processing performed in step 710.

D.2. Encoding

FIG. 8 provides additional detail regarding a procedure 800 for structuring the media information into the desired RTP payload format for VC-1. This procedure 800 includes the steps 704 and 706 of FIG. 7 as component parts thereof.

As a preliminary matter, in step 802, the system 500 (of FIG. 5) can initialize the target module 506 for a communication session. This operation can be performed using any kind of protocol, such as SDP (Session Description Protocol), etc.

The initialization itself can involve making various control settings. As discussed in the previous section (C), a mode=1 control setting can be used to indicate that the sequence layer header specified in the "config" parameter does not change. Since the sequence layer header never changes in "mode=1," the source module 502 can remove it from the bit stream.

A mode=3 control setting can be used to indicate that both the sequence layer header and the entry point header specified in the "config" parameter never change. For this mode, the source module 502 can also omit entry point headers from the Access Units.

Step 802 can also comprise signaling whether the stream will contain B-pictures, e.g., using a bpic parameter. This information is useful because it allows the target module 506 to process the RTP packets in a more efficient manner.

Still other initialization information can be conveyed in step 802. Moreover, the source module 502 can override various initialization settings by sending control information via the sequence layer headers at various junctures in the communication session.

In step 804, the source module 502 expresses a VC-1 frame of media information as one or more Access Units (AUs) in an RTP payload of an RTP packet. FIG. 8 shows that this step 804 can result in at least two different scenarios, labeled scenario A and scenario B. In scenario A, a VC-1 frame is encapsulated by a single AU, where the AU includes an Access Unit header ($H_{AU}$) and a payload ($PL_{AU}$). The AU as a whole forms the payload of an RTP packet. The RTP packet also includes an RTP header ($H_{RTP}$). In scenario B, adding a VC-1 frame to a single AU would cause the RTP packet to exceed the maximum transmission unit (MTU) size. Thus, in this scenario, the source module 502 fragments the VC-1 frame into two or more AUs in two or more respective RTP packets. Still other scenarios are possible; scenarios A and B are merely representative.

In certain circumstances, as discussed in the context of the preceding step 802, the source module 502 can omit certain types of information from the AUs, such as sequence layer headers, entry point headers, and so on. In other circumstances, the source module 502 may already know the actual peak transmission rate at which media information is sent to the target module 506. In this case, the source module 502 can remove all leaky bucket parameter sets from the sequence layer header except for the parameter set that corresponds to the actual peak transmission rate.

In addition to removing unnecessary information from the RTP packets, the source module 502 can also (or can alternatively) introduce redundant information into the RTP packets. For example, the source module 502 can improve robustness against loss of RTP packets by frequently repeating the sequence layer header in the bit stream.

In step 806, the source module 502 can define various control settings which will govern the interpretation of the RTP packet by the target module 506. (In actual practice, steps 804 and 806 may represent an integrated process for producing RTP packets, rather than two distinct operations.) As indicated by the dashed arrows in FIG. 8, the source module 502 can make the settings by defining various values in the header of the RTP packet and in the individual headers of the AUs within the RTP payload.

The actual control settings can include any of the control information set forth in the previous section. An exemplary (and incomplete) list of such settings is set forth below in summary fashion:

A marker bit can be set if the RTP packet contains an Access Unit containing a is complete VC-1 frame, or the last fragment of a VC-1 frame.

A FRAG field in an AU header can be set to indicate that the AU contains a fragmented frame.

An RA Count field in an AU header is set based on the value of a binary modulo 256 counter. The source module 502 or other sending entity can increment the value for the RA Count field for every random access point, and insert such value in the RA Count field for each respective AU. The target module 506 can use this count information to detect the loss of media information, e.g., by detecting a discontinuity in RA Count values in the media information that it receives.

An "RA" field in an AU header can be set only for those AU's that contain a random access point An SL field in an AU header can be toggled if the AU contains a sequence layer header and if the sequence layer header is different from the most recently transmitted sequence layer header.

A PTS Delta field in the AU header specifies the presentation time of the frame as a 2's complement offset (delta) from the timestamp in the RTP header of this RTP packet.

A DTS Delta field in the AU header specifies the decode time of the frame as a 2's complement offset (delta) between the presentation time and the decode time.

The headers can include yet other control information, as more fully set forth in the previous section.

Step 706 involves transmitting the RTP packet(s) created in step 704, upon which the above-described process is repeated. The net effect of the procedure 800 is the transmission of a stream of RTP packets configured according to the desired VC-1 RTP payload format.

FIG. 9 provides additional detail regarding a procedure 900 for processing received RTP information. This procedure 900 includes the steps 704 and 706 of FIG. 7 as component parts thereof. In step 708, the target module 506 receives one or more RTP packets via the communication mechanism 504 or some other conduit of information.

In step 710, the target module 506 processes the RTP packets for output to one or more output devices.

In step 902, which is part of step 710, the target module 506 buffers the RTP packets and performs various pre-processing operations on the received RTP packets. According to one exemplary operation, the target module 506 can determine whether the received information (provided by the RTP packets) includes any omissions, e.g., due to packet loss. For instance, the target module 506 can use the RA Count field to determine whether information has been lost which provided a random access point. The target module 506 can use the SL field to determine whether information has been lost which provided a new (i.e., different) sequence layer header.

According to another exemplary operation, the target module 506 can re-insert information that was deliberately removed by source module 502, such as entry point headers. More specifically, if "mode=3" is signaled and the receiving module 512 receives a complete AU or the first fragment of an AU, and the RA bit is set to 1 but the AU does not begin with an entry point header, then this indicates that the entry point header has been "compressed" by the source module 502. In that case, the receiving module 512 can insert an entry point header at the beginning of the AU. When inserting the entry point header, the receiving module 512 can use the header that is specified by the MIME "config" parameter.

Yet other types of preliminary operations can be performed on the received media information in step 902.

Finally, step 904 entails decoding the media information processed in step 902.

The above described process in procedure 900 is repeated in a loop, such that new media information is continually being added to the buffer, and the received media information is continually being pulled from the buffer for processing.

E. Exemplary Computer Environment

FIG. 10 provides information regarding a computer environment 1000 that can be used to implement any of the processing functions described in the proceeding sections, such as any one of the modules shown in FIG. 5, such as the source module 502 and/or the target module 506, or any subcomponent of these modules (502, 506). However, as described above, there are many other implementations of the source module 502 and the target module 506.

The computing environment 1000 includes a general purpose or sever type computer 1002 and a display device 1004. However, the computing environment 1000 can include other kinds of computing equipment. For example, although not shown, the computer environment 1000 can include handheld or laptop devices, set top boxes, game consoles, mainframe computers, etc. Further, FIG. 10 shows elements of the computer environment 1000 grouped together to facilitate discussion. However, the computing environment 1000 can employ a distributed processing configuration. In a distributed computing environment, computing resources can be physically dispersed throughout the environment.

Exemplary computer 1002 includes one or more processors or processing units 1006, a system memory 1008, and a bus 1010. The bus 1010 connects various system components together. For instance, the bus 1010 connects the processor 1006 to the system memory 1008. The bus 1010 can be implemented using any kind of bus structure or combination of bus structures, including a memory bus or memory controller, a peripheral bus, an accelerated graphics port, and a processor or local bus using any of a variety of bus architectures.

Computer 1002 can also include a variety of computer readable media, including a variety of types of volatile and non-volatile media, each of which can be removable or non-removable. For example, system memory 1008 includes computer readable media in the form of volatile memory, such as random access memory (RAM) 1012, and non-volatile memory, such as read only memory (ROM) 1014. ROM 1014 includes an input/output system (BIOS) 1016 that contains the basic routines that help to transfer information between elements within computer 1002, such as during start-up. RAM 1012 typically contains data and/or program modules in a form that can be quickly accessed by processing unit 1006.

Other kinds of computer storage media include a hard disk drive 1018 for reading from and writing to a non-removable, non-volatile magnetic media, a magnetic disk drive 1020 for reading from and writing to a removable, non-volatile magnetic disk 1022 (e.g., a "floppy disk"), and an optical disk drive 1024 for reading from and/or writing to a removable, non-volatile optical disk 1026 such as a CD-ROM, DVD-ROM, or other optical media. The hard disk drive 1018, magnetic disk drive 1020, and optical disk drive 1024 are each connected to the system bus 1010 by one or more data media interfaces 1028. Alternatively, the hard disk drive 1018, magnetic disk drive 1020, and optical disk drive 1024 can be connected to the system bus 1010 by a SCSI interface (not shown), or other coupling mechanism. Although not shown, the computer 1002 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 1002. For instance, the readable media can store the operating system 1030, application-specific functionality 1032, other program modules 1034, and program data 1036.

The computer environment 1000 can include a variety of input devices. For instance, the computer environment 1000 includes the keyboard 1038 and a pointing device 1040 (e.g., a "mouse") for entering commands and information into computer 1002. The computer environment 1000 can include other input devices (not illustrated), such as a microphone, joystick, game pad, satellite dish, serial port, scanner, card reading devices, digital or video camera, etc. Input/output interfaces 1042 couple the input devices to the processing unit 1006. More generally, input devices can be coupled to the computer 1002 through any kind of interface and bus structures, such as a parallel port, serial port, game port, universal serial bus (USB) port, etc.

The computer environment 1000 also includes the display device 1004. A video adapter 1044 couples the display device 1004 to the bus 1010. In addition to the display device 1004, the computer environment 1000 can include other output peripheral devices, such as speakers (not shown), a printer (not shown), etc.

Computer 1002 operates in a networked environment using logical connections to one or more remote computers, such as a remote computing device 1046. For instance, the computer 1002 may represent the source module 502 of FIG. 5 and the remote computing device 1046 may represent the target module 506 of FIG. 5, or vice versa. The remote computing device 1046 can comprise any kind of computer equipment, including a general purpose personal computer, portable computer, a server, etc. Remote computing device 1046 can include all of the features discussed above with respect to computer 1002, or some subset thereof.

Any type of network 1048 can be used to couple the computer 1002 with remote computing device 1046, such as the WAN 402 of FIG. 4, a LAN, etc. The computer 1002 couples to the network 1048 via network interface 1050 (e.g., the interface 416 shown in FIG. 4), which can utilize broadband connectivity, modem connectivity, DSL connectivity, or other connection strategy. Although not illustrated, the computing environment 1000 can provide wireless communication functionality for connecting computer 1002 with remote computing device 1046 (e.g., via modulated radio signals, modulated infrared signals, etc.).

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computer implemented method for encapsulating VC-1 (Video Codec 1) information in an RTP (Real-Time Transport Protocol) packet, comprising:
   arranging by a computing device, the VC-1 information into a at least one Access Unit, collectively forming an RTP payload; and
   appending by the computing device, an RTP header onto the RTP payload to form the RTP packet, the VC-1 information being arranged in a variable length RTP payload in accordance to a size of the RTP packet compared to a maximum transmission unit (MTU) size to at least avoid IP-level fragmentation, the length of the RTP payload being determined during the encapsulation of the VC-1 information, wherein at least a portion of the method is implemented in a computer,
wherein a frame of VC-1 information is fragmented over plural Access Units in response to the size of the RTP packet being greater than the MTU size, each of the plural Access Units being assigned to a separate RTP packet, and an RTP payload of one of the separate RTP packets includes a last of the plural Access Units and does not include any other Access Units of other frames of VC-1 information based on a rule preventing the inclusion of portions of two or more frames of VC-1 information in a same RTP payload.

2. The method of claim 1, wherein an Access Unit contains a complete frame of VC-1 information in response to the size of the RTP packet being not greater than the MTU size.

3. The method of claim 1, further comprising setting control information in a header of an Access Unit to indicate that the Access Unit includes a fragment of a frame.

4. The method of claim 1, further comprising, after receipt of the plural Access Units, reassembling the frame of VC-1 information from the plural Access Units, prior to decoding the VC-1 information.

5. The method of claim 1, further comprising, after receipt of the plural Access Units, reassembling fragments of the frame of VC-1 information into at least one encapsulated bit-stream data unit (EBDU).

6. The method of claim 1, further comprising providing control information to indicate that the VC-1 information contains no pictures that require reordering.

7. The method of claim 1, further comprising incrementing a counter in a header of an Access Unit to detect the occurrence of a random access point.

8. The method of claim 1, further comprising setting control information in a header of an Access Unit to indicate that the Access Unit contains a random access point.

9. The method of claim 1, further comprising: determining an actual peak transmission rate; and reducing a number of parameters expressed in Access Units to remove superfluous parameter information that does not pertain to the actual peak transmission rate.

10. The method of claim 1, further comprising redundantly repeating a sequence layer header within a bitstream defined by a sequence of RTP packets to make the bitstream more resilient to loss of information.

11. The method of claim 1, further comprising including control information in a header of an Access Unit to indicate that a sequence layer header has been transmitted which differs from an immediately preceding sequence layer header.

12. The method of claim 1, further comprising providing control information to indicate that a sequence layer header does not vary within a bitstream defined by a sequence of RTP packets.

13. The method of claim 12, further comprising omitting the sequence layer headers that do not vary from the bitstream.

14. The method of claim 1, further comprising providing control information to indicate that an entry point header does not vary within a bitstream defined by a sequence to of RTP packets.

15. The method of claim 14, further comprising: omitting the entry point headers that do not vary from the bitstream; and reinserting the entry point headers in the bitstream prior to decoding the bitstream.

16. An RTP (Real-Time Transport Protocol) data structure for encapsulating VC-1 (Video Codec 1) information in an RTP packet, as stored on one or more non-transitory computer readable media, comprising:
an RTP packet including an RTP header and a variable length RTP payload,
wherein the RTP payload includes at least one Access Unit,
wherein said at least one Access Unit comprises an Access Unit header and an Access Unit payload,
wherein said at least one Access Unit comprises a fragment of a VC-1 frame, the VC-1 frame being fragmented over plural Access Units in response to the size of the RTP packet being greater than a maximum transmission unit (MTU) size, each of the plural Access Units being assigned to a separate RTP packet, and the length of the RTP payload being determined during the encapsulation of the VC-1 information, and
wherein an RTP payload of one of the separate RTP packets includes a last of the plural Access Units and does not include any other Access Units of other frames of VC-1 information based on a rule preventing the inclusion of portions of two or more frames of VC-1 information in a same RTP payload.

17. A source module configured to encapsulate VC-1 (Video Codec 1) information in an RTP (Real-Time Transport Protocol) packet, comprising:
logic configured to be operated by a processor to arrange the VC-1 information into a at least one Access Unit, collectively forming a variable length RTP payload; and
logic configured to be operated by the processor to append an RTP header onto the RTP payload to form the RTP packet in accordance to a size of the RTP packet compared to a maximum transmission unit (MTU) size to at least avoid IP-level fragmentation, the length of the RTP payload being determined during the formation of the RTP packet,
wherein a frame of VC-1 information is fragmented over plural Access Units in response to the size of the RTP packet being greater than the MTU size, each of the plural Access Units being assigned to a separate RTP packet, and an RTP payload of one of the separate RTP packets includes a last of the plural Access Units and does not include any other Access Units of other frames of VC-1 information based on a rule preventing the inclusion of portions of two or more frames of VC-1 information in a same RTP payload.

* * * * *